(12) United States Patent
Tanaka et al.

(10) Patent No.: US 12,556,208 B2
(45) Date of Patent: Feb. 17, 2026

(54) HIGH FREQUENCY SIGNAL RERADIATING DEVICE, HIGH FREQUENCY SIGNAL RECEIVING DEVICE, AND WIRELESS SYSTEM

(71) Applicant: SONY SEMICONDUCTOR SOLUTIONS CORPORATION, Kanagawa (JP)

(72) Inventors: Katsuyuki Tanaka, Kanagawa (JP); Tatsuhiro Kawaguchi, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 323 days.

(21) Appl. No.: 18/041,854

(22) PCT Filed: Jul. 2, 2021

(86) PCT No.: PCT/JP2021/025182
§ 371 (c)(1),
(2) Date: Feb. 16, 2023

(87) PCT Pub. No.: WO2022/044547
PCT Pub. Date: Mar. 3, 2022

(65) Prior Publication Data
US 2023/0299799 A1  Sep. 21, 2023

(30) Foreign Application Priority Data
Aug. 27, 2020 (JP) .................. 2020-143076

(51) Int. Cl.
*H04B 1/04* (2006.01)
*G01S 19/11* (2010.01)
(Continued)

(52) U.S. Cl.
CPC ............ *H04B 1/0071* (2013.01); *G01S 19/11* (2013.01); *H04L 7/06* (2013.01)

(58) Field of Classification Search
CPC .. H04B 1/0007; H04B 1/0071; H04B 1/0075; H04B 1/04; H04B 1/16; G01S 1/042;
(Continued)

(56) References Cited

U.S. PATENT DOCUMENTS

2018/0188698 A1*  7/2018  Dionne .................. G04R 20/04
2018/0217265 A1    8/2018  Pieroni et al.

FOREIGN PATENT DOCUMENTS

JP   2000-314771 A   11/2000
JP   2004-177311 A    6/2004
(Continued)

OTHER PUBLICATIONS

International Search Report and Written Opinion of PCT Application No. PCT/JP2021/025182, issued on Sep. 28, 2021, 09 pages of ISRWO.

*Primary Examiner* — Tuan Pham
(74) *Attorney, Agent, or Firm* — CHIP LAW GROUP

(57) ABSTRACT

Provided is a high frequency signal receiving unit that receives a first high frequency signal and that generates a first intermediate frequency signal. A packet generating unit generates a packet on the basis of the first high frequency signal. A packet output unit outputs the generated packet to a communication path. A packet receiving unit receives the packet via the communication path. A packet interpreting unit performs synchronization processing for the packet and generates a second intermediate frequency signal. A high frequency signal transmitting unit converts the second intermediate frequency signal into a second high frequency signal and transmits the second high frequency signal. A wireless receiver receives the second high frequency signal
(Continued)

and performs positioning or time synchronization on the basis of the second high frequency signal.

15 Claims, 23 Drawing Sheets

(51) Int. Cl.
*H04B 1/00* (2006.01)
*H04L 7/06* (2006.01)

(58) Field of Classification Search
CPC .......... G01S 1/045; G01S 19/11; G01S 19/13; G01S 19/39
See application file for complete search history.

(56) References Cited

FOREIGN PATENT DOCUMENTS

| | | |
|---|---|---|
| JP | 2008-134947 A | 6/2008 |
| JP | 2013-235008 A | 11/2013 |

* cited by examiner

F I G . 2 1
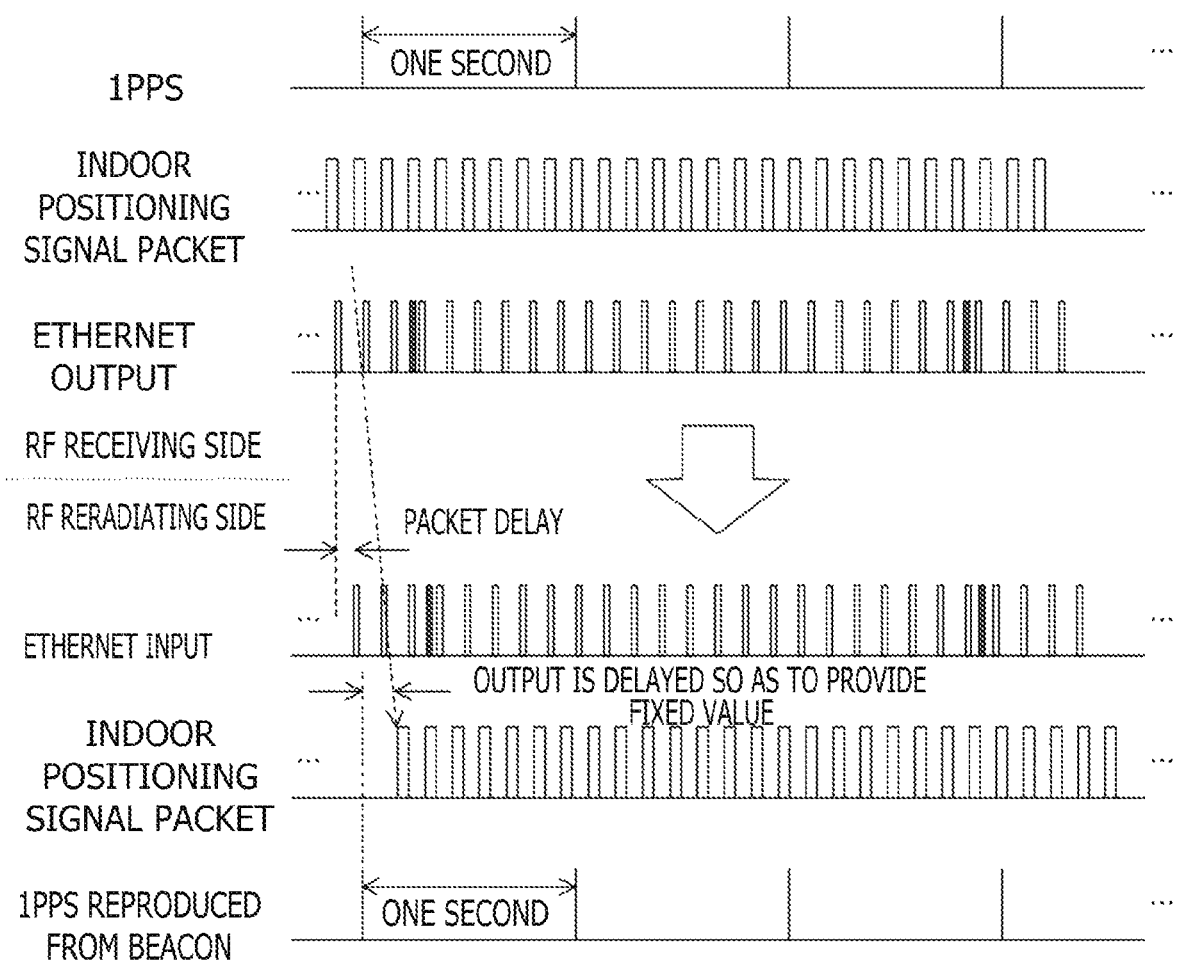

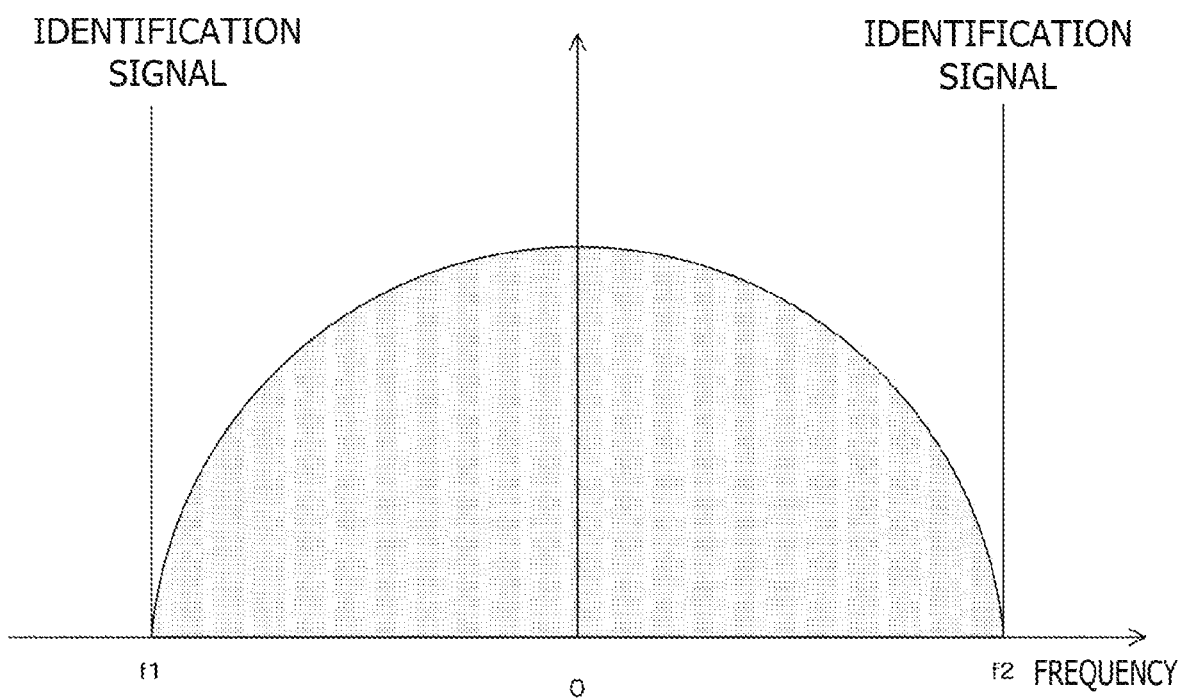

HIGH FREQUENCY SIGNAL RERADIATING DEVICE, HIGH FREQUENCY SIGNAL RECEIVING DEVICE, AND WIRELESS SYSTEM

CROSS REFERENCE TO RELATED APPLICATIONS

This application is a U.S. National Phase of International Patent Application No. PCT/JP2021/025182 filed on Jul. 2, 2021, which claims priority benefit of Japanese Patent Application No. JP 2020-143076 filed in the Japan Patent Office on Aug. 27, 2020. Each of the above-referenced applications is hereby incorporated herein by reference in its entirety.

TECHNICAL FIELD

The present technology relates to a wireless system, and particularly to a high frequency signal reradiating device, a high frequency signal receiving device, and a wireless system for performing positioning or time synchronization.

BACKGROUND ART

A GNSS (Global Navigation Satellite System) receiver that receives a GNSS signal can obtain not only position information but also accurate time synchronized with a highly accurate clock of GNSS. Time synchronization can be performed at one microsecond or less by use of a plurality of GNSS receivers. The GNSS receivers are often unable to receive a GNSS signal from a satellite indoors. Therefore, the GNSS receivers cannot be used as they are indoors. Accordingly, a system has been proposed in which a signal from a satellite is received in a server and time information and space information are distributed to terminal devices (see PTL 1, for example).

CITATION LIST

Patent Literature

[PTL 1]
Japanese Patent Laid-Open No. 2008-134947

SUMMARY

Technical Problems

The above-described conventional technology allows usage of the time information and the space information in indoor terminals. However, this conventional technology assumes the usage in terminals connected to a local area network, and the usage is not possible in an ordinary GNSS receiver. In addition, the time information and the space information cannot be used in a case where a terminal assumed in the conventional technology is moved to the outdoors.

The present technology has been created in view of such circumstances, and it is an object of the present technology to enable GNSS receivers used outdoors to be used also indoors.

Solution to Problems

The present technology has been made to solve the above-described problems. A first aspect of the present technology is a high frequency signal reradiating device including a packet receiving unit configured to receive a packet generated on the basis of a first high frequency signal, a packet interpreting unit configured to perform synchronization processing for the packet and generate an intermediate frequency signal, and a high frequency signal transmitting unit configured to convert the intermediate frequency signal into a second high frequency signal and transmit the second high frequency signal. This provides an effect of reradiating the second high frequency signal obtained from the received packet.

In addition, in this first aspect, the packet interpreting unit may detect a missing part of the packet and interpolate dummy data in the missing part. This provides an effect of maintaining synchronization while preventing packets from becoming a discontinuous signal.

In addition, in this first aspect, the packet interpreting unit may include a buffer memory configured to hold the packet, and a rate adjusting unit configured to read the packet from the buffer memory on the basis of a remaining amount in the buffer memory and output the intermediate frequency signal according to a clock frequency shared with the high frequency signal transmitting unit. This provides an effect of maintaining synchronization while adjusting the rate of packets.

In addition, in this first aspect, further included may be a delay measuring unit configured to measure a delay time between the high frequency signal reradiating device and another device that generates the packet, and the packet interpreting unit may generate the intermediate frequency signal on the basis of the delay time. This provides an effect of improving the accuracy of time synchronization. In this case, the delay measuring unit may measure the delay time by transmitting and receiving a delay measurement packet to and from the other device. This provides an effect of improving the accuracy of time synchronization by use of the delay measurement packet.

In addition, in this first aspect, further included may be a beacon receiving unit configured to receive a time-synchronized beacon signal, and the packet interpreting unit may generate the intermediate frequency signal on the basis of reception timing of the beacon signal. This provides an effect of improving the accuracy of time synchronization by use of the beacon signal.

In addition, in this first aspect, the high frequency signal transmitting unit may add an identification signal for identifying a reradiated signal to the second high frequency signal and transmit the second high frequency signal. This provides an effect of making a reradiated signal identified on the receiving side of the second high frequency signal.

In addition, in this first aspect, the packet may include a GNSS signal and may also include an indoor positioning signal loaded with time information synchronized with a synchronizing pulse.

In addition, a second aspect of the present technology is a high frequency signal receiving device including a high frequency signal receiving unit configured to receive a high frequency signal and generate an intermediate frequency signal, a packet generating unit configured to generate a packet on the basis of the high frequency signal, and a packet output unit configured to output the generated packet to a communication path. This provides effects of converting the received high frequency signal into a packet and outputting the packet to the communication path.

In addition, in this second aspect, the packet generating unit may receive a GNSS signal as the high frequency signal and generate the packet including the GNSS signal.

In addition, in this second aspect, the packet generating unit may receive a GNSS signal as the high frequency signal, obtain a synchronizing pulse from the GNSS signal, and generate the packet including an indoor positioning signal loaded with time information synchronized with the synchronizing pulse.

In addition, in this second aspect, further included may be a beacon transmitting unit configured to transmit a beacon in timing synchronized with the synchronizing pulse.

In addition, in this second aspect, further included may be a delay measuring unit configured to measure a delay time between the high frequency signal receiving device and another device that receives the packet, and the packet generating unit may generate the packet on the basis of the delay time. This provides an effect of improving the accuracy of time synchronization. In this case, the delay measuring unit may measure the delay time by transmitting and receiving a delay measurement packet to and from the other device. This provides an effect of improving the accuracy of time synchronization by use of the delay measurement packet.

In addition, in this second aspect, the packet generating unit may generate the packet to which an identification signal for identifying a reradiated signal is added. This provides an effect of making the reradiated high frequency signal identified as a reradiated signal on the receiving side of the reradiated high frequency signal.

In addition, a third aspect of the present technology is a wireless system including a high frequency signal receiving device including a high frequency signal receiving unit configured to receive a first high frequency signal and generate a first intermediate frequency signal, a packet generating unit configured to generate a packet on the basis of the first high frequency signal, and a packet output unit configured to output the generated packet to a communication path, a high frequency signal reradiating device including a packet receiving unit configured to receive the packet via the communication path, a packet interpreting unit configured to perform synchronization processing for the packet and generate a second intermediate frequency signal, and a high frequency signal transmitting unit configured to convert the second intermediate frequency signal into a second high frequency signal and transmit the second high frequency signal, and a wireless receiver configured to receive the second high frequency signal and perform positioning or time synchronization on the basis of the second high frequency signal. This provides effects of converting the first high frequency signal received in the high frequency signal receiving device into a packet and transmitting the packet, reradiating the second high frequency signal in the high frequency signal reradiating device, and performing positioning or time synchronization in the wireless receiver.

BRIEF DESCRIPTION OF DRAWINGS

FIG. 21 is a diagram illustrating an example of operation of the wireless system in the sixth embodiment of the present technology.

FIG. 23 is a diagram illustrating an example of a spectrum of an intermediate frequency signal including identification signals in the seventh embodiment of the present technology.

DESCRIPTION OF EMBODIMENTS

Modes for carrying out the present technology (which modes will hereinafter be referred to as embodiments) will hereinafter be described. The description will be made in the following order.

1. First Embodiment (an example of packetizing a GNSS signal)
2. Second Embodiment (an example of packetizing an indoor positioning signal)
3. Third Embodiment (an example of packetizing an indoor positioning signal corrected for a delay time)
4. Fourth Embodiment (an example of making correction with a delay time with 1PPS as a starting point on a packet receiving side)
5. Fifth Embodiment (an example of correcting a delay from a delay amount of a packet on the packet receiving side)
6. Sixth Embodiment (an example of receiving a beacon synchronous with 1PPS and adjusting a delay amount)
7. Seventh Embodiment (an example of adding an identification signal of a reradiation signal)

1. First Embodiment

Wireless System

Figure 1:
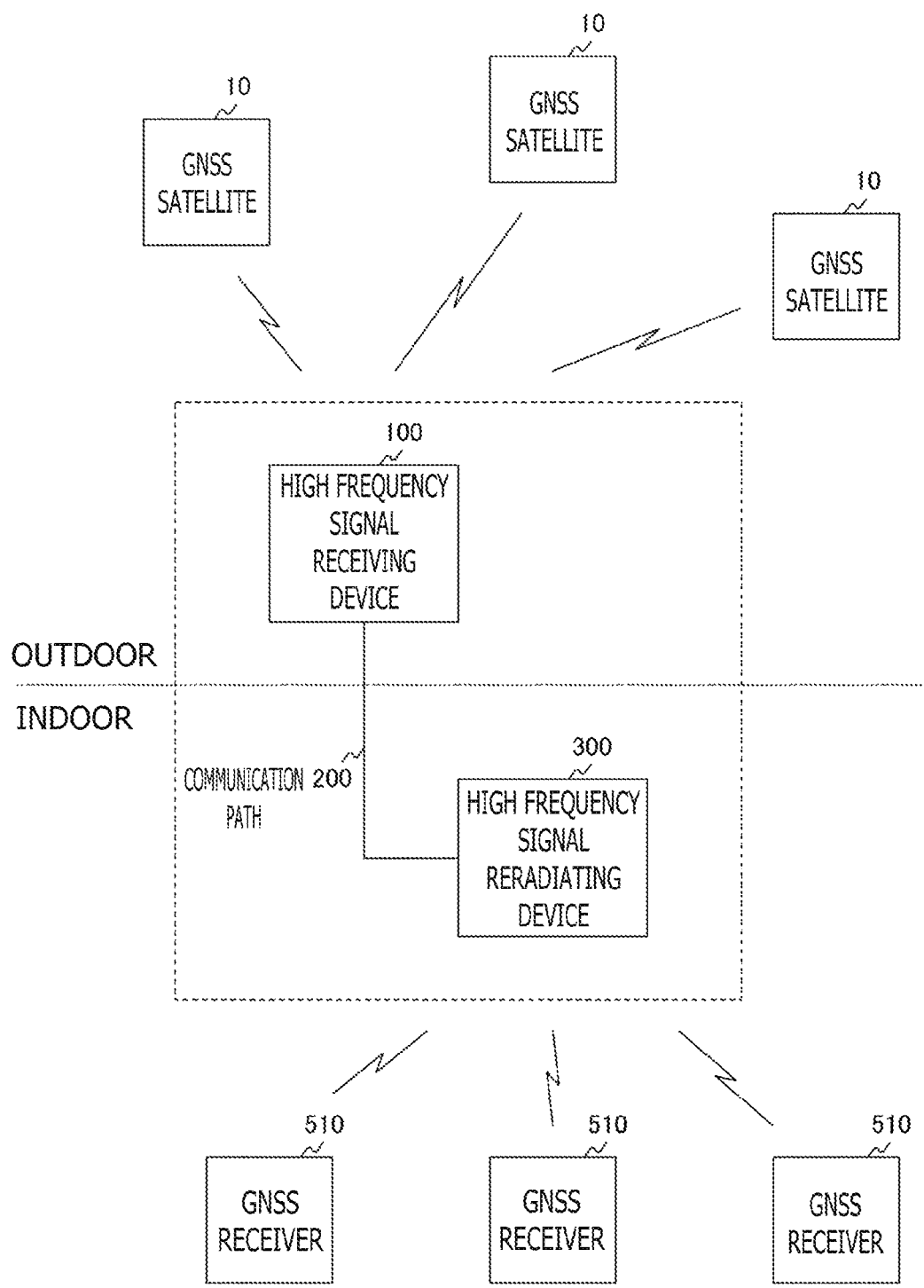
FIG. 1 is a diagram illustrating an outline of an example of a wireless system in an embodiment of the present technology.

FIG. 1 is a diagram illustrating an outline of an example of a wireless system in an embodiment of the present technology.

This wireless system is a system that receives GNSS signals from GNSS satellites 10. The wireless system includes a high frequency signal receiving device 100, a high frequency signal reradiating device 300, and GNSS receivers 510.

The high frequency signal receiving device 100 is a device that receives a GNSS signal from a GNSS satellite 10 as a high frequency signal, generates a predetermined packet, and outputs the packet to a communication path 200.

The high frequency signal reradiating device 300 is a device that receives the packet output to the communication path 200, interprets the packet, and reradiates the packet as a high frequency signal. It is assumed that the high frequency signal receiving device 100 is disposed outdoors and that the high frequency signal reradiating device 300 is disposed indoors.

That is, the high frequency signal receiving device 100 receives a GNSS signal from a GNSS satellite 10 outdoors, and transmits a packet through the communication path 200, and the high frequency signal reradiating device 300 reradiates the packet as a high frequency signal to the indoor GNSS receivers 510.

A GNSS receiver 510 is an apparatus that receives a GNSS signal from a GNSS satellite 10 outdoors, and performs positioning or time synchronization. However, in the present embodiment, the GNSS receiver 510 is assumed to be also used indoors, and the high frequency signal reradiating device 300 reradiates a high frequency signal to the GNSS receiver 510. Incidentally, the GNSS receiver 510 is an example of a wireless receiver described in claims.

Thus, the GNSS receiver 510 can be used both indoors and outdoors.

Figure 2:
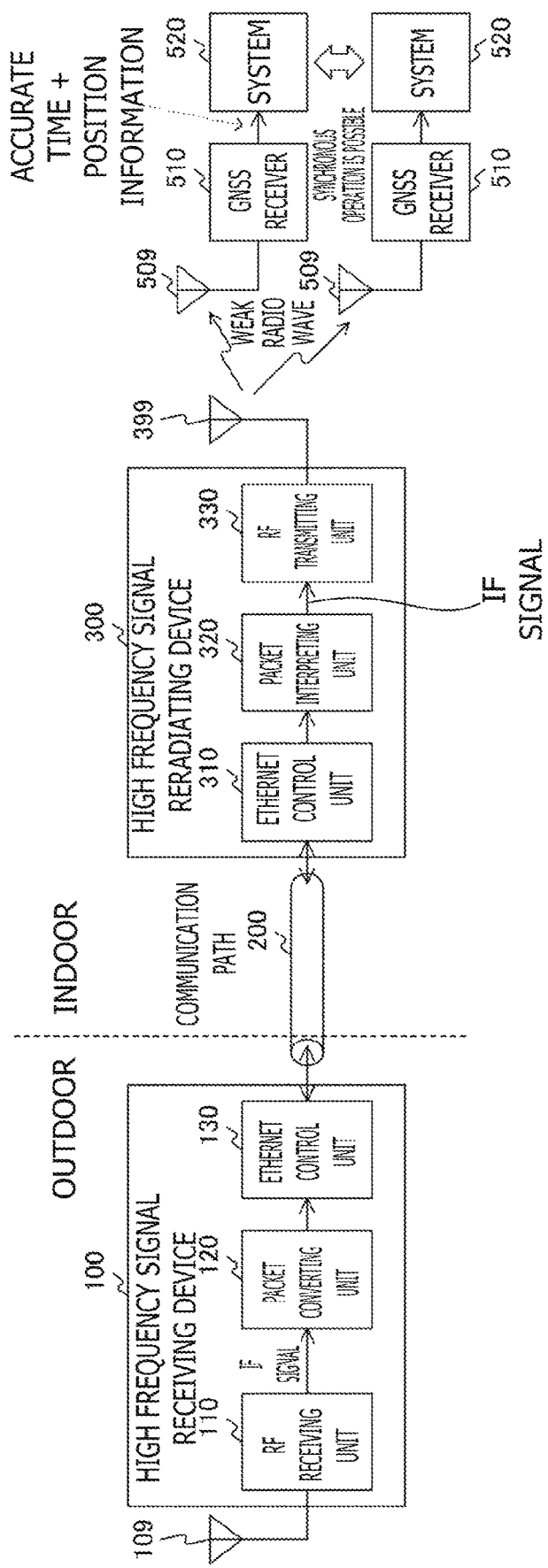
FIG. 2 is a diagram illustrating an example of a configuration of a wireless system in a first embodiment of the present technology.

FIG. 2 is a diagram illustrating an example of a configuration of the wireless system in a first embodiment of the present technology.

Incidentally, in the following, a high frequency signal may be referred to as an "RF" (Radio Frequency) or an "RF signal," and an intermediate frequency signal may be referred to as an "IF" (Intermediate Frequency) or an "IF signal."

The high frequency signal receiving device 100 includes an RF receiving unit 110, a packet converting unit 120, and an Ethernet control unit 130.

The RF receiving unit 110 converts a GNSS signal, which is a high frequency signal received via an antenna 109, into a digital IF signal, and outputs the digital IF signal.

The packet converting unit 120 converts the IF signal into a packet to be sent out to Ethernet.

The Ethernet control unit 130 sends out the packet converted by the packet converting unit 120 to the communication path 200. Incidentally, the Ethernet control unit 130 is an example of a packet output unit described in claims.

The communication path 200 may be either of a wired communication path and a wireless communication path. Assumed as the wired communication path 200 is, for example, an Ethernet cable (for example, 100base-T), PoE (Power over Ethernet), a power line, or the like. In addition, WiFi (registered trademark) or the like, for example, is assumed as the wireless communication path 200. In addition, UDP (User Datagram Protocol), TCP (Transmission Control Protocol), or the like is assumed as a protocol of packets transmitted in the communication path 200.

Incidentally, packet transmission in the communication path 200 is performed mainly in one direction from the high frequency signal receiving device 100 to the high frequency signal reradiating device 300. However, negotiation in a network is performed in an initial stage. Therefore, two-way communication is performed as a whole.

The high frequency signal reradiating device 300 includes an Ethernet control unit 310, a packet interpreting unit 320, and an RF transmitting unit 330.

The Ethernet control unit 310 receives the packet output to the communication path 200. Incidentally, the Ethernet control unit 310 is an example of a packet receiving unit described in claims.

The packet interpreting unit 320 performs processing of interpreting the received packet, and returning the packet to an IF signal. At a time of a packet loss, the packet interpreting unit 320 interpolates an all-zero packet, for example, as will be described later.

The RF transmitting unit 330 converts the digital IF signal output from the packet interpreting unit 320 into an RF signal, and transmits a GNSS signal via an antenna 399.

In this wireless system, the outdoor antenna 109 receives a GNSS signal of 1575.42 MHz, for example. This antenna 109 is desirably located in an excellent reception environment, for example, on a rooftop. However, the antenna 109 may be, for example, on an indoor side of a window or the like as long as the antenna 109 can receive GNSS signals.

In addition, the antenna 399 for reradiation can use the same frequency (for example, 1575.42 MHz) as that of GNSS signals from the GNSS satellites 10. In this case, a weak radio wave suffices as a signal used for reradiation of the GNSS signal, and therefore the signal does not affect other apparatuses.

The GNSS receivers 510 are connected with a system 520 such as a terminal. The above-described reradiation enables the GNSS receivers 510 to supply accurate time and position information to the systems 520. Here, directing attention to a delay, a delay from the antenna 109 to the antenna 399 is common to any of the systems 520. On the other hand, a difference between distances from the antenna 399 to antennas 509 of the GNSS receivers 510 can be considered to be approximately 20 meters at a maximum. Thus, a delay time is 100 nanoseconds or less. Hence, even in consideration of these delays, highly accurate synchronous operation can be performed between the systems 520.

High Frequency Signal Receiving Device

Figure 3:
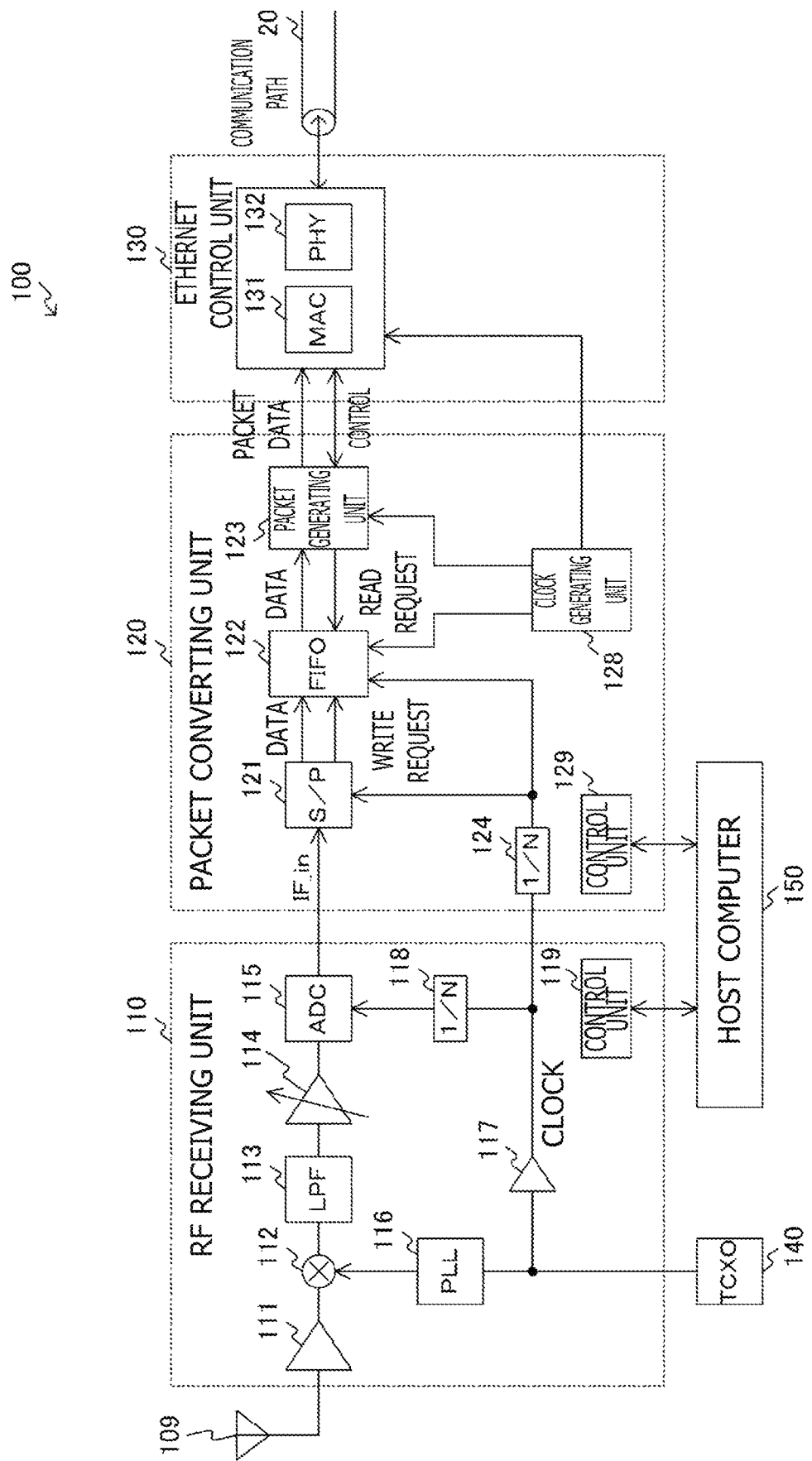
FIG. 3 is a diagram illustrating an example of a configuration of a high frequency signal receiving device 100 in the first embodiment of the present technology.

FIG. 3 is a diagram illustrating an example of a configuration of the high frequency signal receiving device 100 in the first embodiment of the present technology.

As described above, the high frequency signal receiving device 100 includes the RF receiving unit 110, the packet converting unit 120, and the Ethernet control unit 130. The high frequency signal receiving device 100 also includes a temperature-compensated crystal oscillator (TCXO: Temperature-Compensated crystal Oscillator) 140 and a host computer 150. The temperature-compensated crystal oscillator 140 outputs a signal of an oscillation frequency such as 16.368 MHz or 26 MHz, for example.

The RF receiving unit 110 includes a low-noise amplifier 111, a mixer 112, a low-pass filter 113, a variable gain amplifier 114, an AD converter 115, a phase-locked loop circuit 116, a buffer 117, a frequency divider 118, and a control unit 119.

The low-noise amplifier (LNA: Low Noise Amplifier) 111 is an amplifier that amplifies a high frequency signal received by the antenna 109. The phase-locked loop circuit (PLL: Phase Locked Loop) 116 is a circuit that generates a phase-synchronized signal on the basis of an output of the temperature-compensated crystal oscillator 140. The mixer 112 is a circuit that downconverts the high frequency signal amplified by the low-noise amplifier 111 into a baseband signal by mixing the high frequency signal with the signal from the phase-locked loop circuit 116.

The low-pass filter (LPF: Low-pass filter) 113 is a filter that limits a band by removing a high-frequency component of the baseband signal output from the mixer 112. The variable gain amplifier (VGA: Variable-Gain Amplifier) 114 is an amplifier that amplifies an output of the low-pass filter 113 with a variable gain.

The buffer 117 is a circuit that amplifies the output of the temperature-compensated crystal oscillator 140, and distributes the amplified output as a clock signal. The frequency divider 118 is a circuit that frequency-divides the clock signal distributed from the buffer 117 into 1/N.

The AD converter (ADC: Analog-to-Digital Converter) 115 is a circuit that converts the analog signal amplified by the variable gain amplifier 114 into a digital signal. The AD converter 115 operates in synchronism with the clock signal from the frequency divider 118, and outputs the converted digital signal as an intermediate frequency signal IF_in. An IQ modulated signal, for example, is assumed as this intermediate frequency signal. In IQ modulation, respective signals on an I-channel (In-phase: an in-phase component) and a Q-channel (Quadrature: a quadrature component) are used as the baseband signal. Here, a signal of 2.046 Msps (sample per second) using one bit on the I-channel and one bit on the Q-channel, that is, a total of two bits is assumed.

The control unit 119 controls the whole of the RF receiving unit 110.

The packet converting unit 120 includes a serial/parallel converter 121, a FIFO 122, a packet generating unit 123, a frequency divider 124, a clock generating unit 128, and a control unit 129.

The serial/parallel converter 121 is a circuit that converts the intermediate frequency signal IF_in input from the RF receiving unit 110 from a serial signal to a parallel signal. This serial/parallel converter 121 outputs a write request to the FIFO 122 together with data converted into the parallel signal. A signal of 0.5115 Msps as eight-bit width data, for example, is assumed as the data output from the serial/parallel converter 121.

The FIFO 122 is FIFO (First-In First-Out) buffer that holds the data of the intermediate frequency signal converted into the parallel signal by the serial/parallel converter 121.

The frequency divider 124 is a circuit that frequency-divides the clock signal distributed from the buffer 117 into 1/N. The write operations of the serial/parallel converter 121 and the FIFO 122 operate in synchronism with the clock signal from the frequency divider 124.

The packet generating unit 123 outputs a read request to the FIFO 122, reads data held in the FIFO 122, and generates a packet. The packet output from the packet generating unit 123 has a capacity of 170 bytes per packet, for example.

The clock generating unit 128 generates a clock signal used in an operation of reading data from the FIFO 122 and subsequent operation. That is, the read operations of the packet generating unit 123 and the FIFO 122 operate in synchronism with the clock signal from the clock generating unit 128.

The control unit 129 controls the whole of the packet converting unit 120.

The Ethernet control unit 130 controls a MAC (Medium Access Control) layer 131 and a physical layer (PHY layer) 132. The Ethernet control unit 130 outputs the packets to the communication path 200 in synchronism with the clock signal from the clock generating unit 128.

The host computer 150 controls the operation of the high frequency signal receiving device 100. The host computer 150 connects to the control unit 119 for the RF receiving unit 110, connects to the control unit 129 for the packet converting unit 120, and performs various kinds of settings, a monitoring operation, and the like.

Packets

Figure 4:
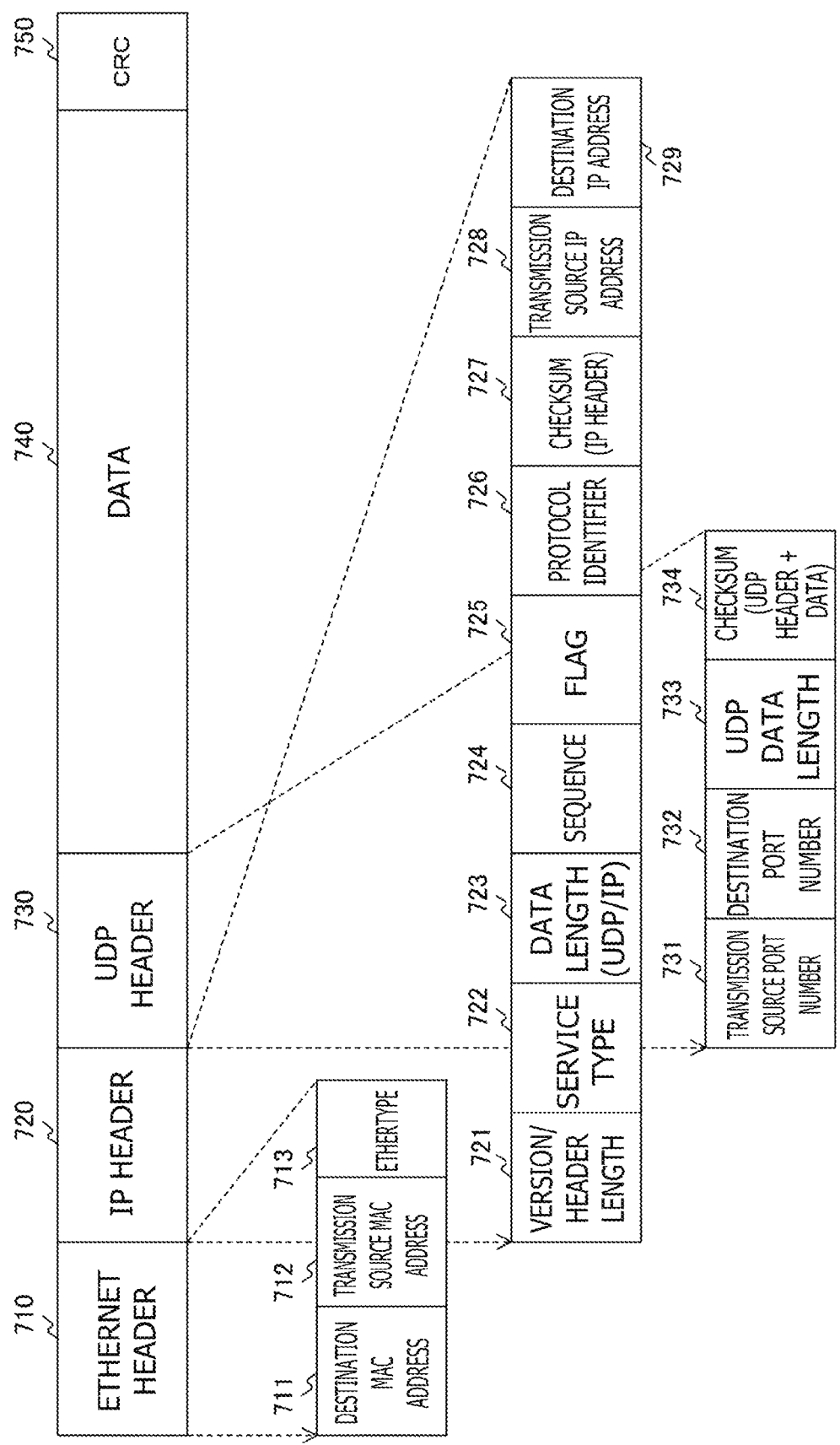
FIG. 4 is a diagram illustrating an example of format configuration of a packet output from the high frequency signal receiving device 100 in the first embodiment of the present technology.

FIG. 4 is a diagram illustrating an example of a format configuration of a packet output from the high frequency signal receiving device 100 in the first embodiment of the present technology.

An example in a case where UDP is adopted as a protocol of packets output from the high frequency signal receiving device 100 is illustrated. UDP does not perform retransmission processing at a time of an error, flow control, or the like. Thus, UDP has a higher transmission efficiency than TCP, and can be expected to provide high-speed transmission. In the present embodiment, it is assumed that UDP is adopted because a small number of bit errors can be handled at a time of reradiation, and data at a time of a CRC error can be used.

In the present example, an Ethernet header 710, an IP header 720, a UDP header 730, and a CRC 750 are added to data 740 transmitted as a packet.

The Ethernet header 710 stores a destination MAC address 711, a transmission source MAC address 712, and an Ethertype 713.

The destination MAC address 711 is a field indicating the MAC address of a destination device of this packet, that is, the high frequency signal reradiating device 300. The transmission source MAC address 712 is a field indicating the MAC address of a transmission source device of this packet, that is, the high frequency signal receiving device 100.

The Ethertype 713 is a field indicating a number for identifying a protocol of a higher layer. In the present example, IP (Internet Protocol) is assumed as the protocol of the higher layer, and therefore "0800" is indicated.

The IP header 720 stores a version/header length 721, a service type 722, a data length 723, a sequence 724, a flag 725, a protocol identifier 726, a checksum 727, a transmission source IP address 728, and a destination IP address 729.

The version/header length 721 is a field in which four bits of a first half indicate a version, and four bits of a second half indicate a header length. As the version, "4" is indicated in a case of IPv4, for example. The header length is in units of 4 bytes. The header length indicates "5" in a case of 20 bytes.

The service type 722 is a field indicating a type of service. The three most significant bits of the service type 722 store an IP precedence value indicating priority.

The data length 723 is a field indicating a UDP/IP data length including the headers.

The sequence 724 is an identifier incremented for each packet. This enables the packet to be identified in a case where the packet is divided on the way.

The flag 725 is a field storing information regarding fragments.

The protocol identifier 726 is a field identifying a protocol. In the case of UDP, the protocol identifier 726 indicates "11."

The checksum 727 is a field storing a checksum of the IP header.

The transmission source IP address 728 is a field indicating the IP address of the transmission source. In the present embodiment, any of multicast, unicast, and broadcast may be selected. In a case of multicast, the transmission source IP address 728 indicates an all-F value.

The destination IP address 729 is a field indicating the IP address of the destination.

The UDP header 730 stores a transmission source port number 731, a destination port number 732, a UDP data length 733, and a checksum 734.

The transmission source port number 731 is a field indicating the port number of the transmission source.

The destination port number 732 is a field indicating the port number of the destination.

The UDP data length 733 is a field indicating the length of the UDP data 740 by a hexadecimal number.

The checksum 734 is a field indicating a checksum of the UDP header 730 and the data 740.

The CRC 750 is a field storing an error detection code based on a cyclic redundancy check (CRC: Cyclic Redundancy Check).

In the present embodiment, the data 740 includes the intermediate frequency signal of the GNSS signal and additional information. The additional information includes, for example, a packet serial number, timing information, a control code, and the like. The packet serial number is a number given to each packet in order. The timing information indicates a time segment as timing. The control code selects a destination in a case where there are a plurality of transmission destinations.

High Frequency Signal Reradiating Device

Figure 5:
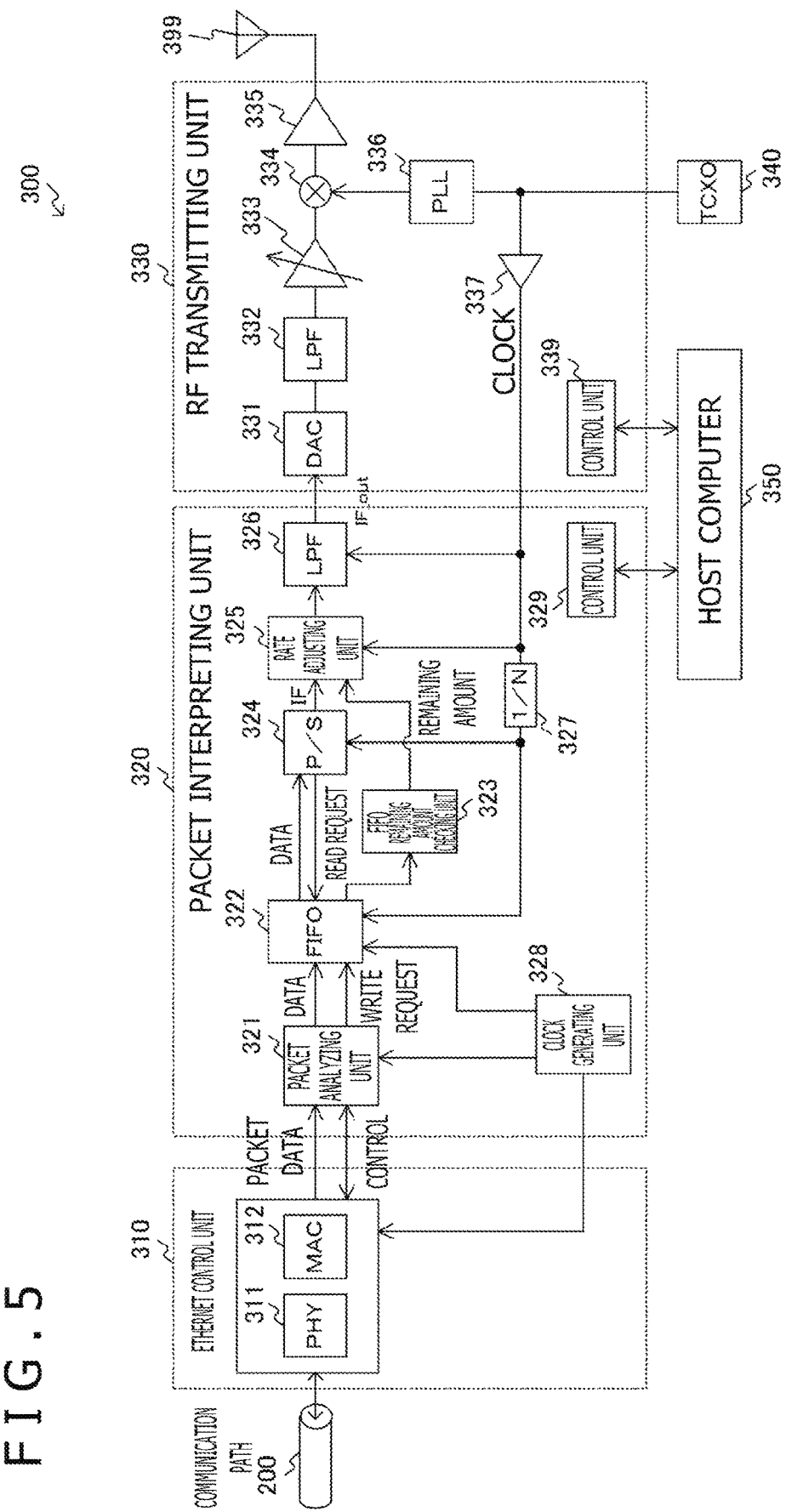
FIG. 5 is a diagram illustrating an example of a configuration of a high frequency signal reradiating device 300 in the first embodiment of the present technology.

FIG. 5 is a diagram illustrating an example of a configuration of the high frequency signal reradiating device 300 in the first embodiment of the present technology.

As described above, the high frequency signal reradiating device 300 includes the Ethernet control unit 310, the packet interpreting unit 320, and the RF transmitting unit 330. The high frequency signal reradiating device 300 also includes a temperature-compensated crystal oscillator 340 and a host computer 350.

The temperature-compensated crystal oscillator 340 outputs a signal of an oscillation frequency such as 16.368 MHz or 26 MHz. The output of the temperature-compensated crystal oscillator 340 is distributed to parts of the packet interpreting unit 320 via a buffer 337 of the RF transmitting unit 330.

The Ethernet control unit 310 controls a MAC layer 311 and a physical layer (PHY layer) 312. This Ethernet control unit 310 receives packets from the communication path 200 in synchronism with a clock signal from a clock generating unit 328 to be described later.

The packet interpreting unit 320 includes a packet analyzing unit 321, a FIFO 322, a FIFO remaining amount checking unit 323, a parallel/serial converter 324, a rate adjusting unit 325, a low-pass filter 326, a frequency divider 327, a clock generating unit 328, and a control unit 329. The frequency divider 327 is a circuit that frequency-divides a clock signal distributed from the buffer 337 into 1/N. The clock signal distributed from the buffer 337 is supplied to the rate adjusting unit 325 and the low-pass filter 326. The clock signal frequency-divided by the frequency divider 327 is used for the read operations of the parallel/serial converter 324 and the FIFO 322.

The packet analyzing unit 321 analyzes a received packet, and performs predetermined processing. Specifically, the packet analyzing unit 321 identifies a packet addressed to the own device, and extracts a data part of the intermediate frequency signal. Then, when the packet analyzing unit 321 detects a missing part of the packet from a serial number, the packet analyzing unit 321 interpolates dummy data (for example, all zeros) for the missing part so as not to provide a discontinuous signal. Consequently, synchronization can be maintained in UDP transmission in which retransmission control is not performed.

The FIFO 322 is a FIFO buffer that holds the packet output from the packet analyzing unit 321. The packet analyzing unit 321 outputs a write request to the FIFO 322, and writes the packet to the FIFO 322. Incidentally, when the size of this FIFO 322 is set larger than an amount of delay variation on the assumed Ethernet, the same data rate as that of the input to the serial/parallel converter 121 of the high frequency signal receiving device 100 can be maintained without interrupting the output of the parallel/serial converter 324. Incidentally, the FIFO 322 is an example of a buffer memory described in claims.

The clock generating unit 328 generates a clock signal used in and before an operation of writing the packet to the FIFO 322. That is, the Ethernet control unit 310, the packet analyzing unit 321, and the operation of writing the packet to the FIFO 322 operate in synchronism with the clock signal from the clock generating unit 328.

The parallel/serial converter 324 is a circuit that converts the data of a parallel signal held in the FIFO 322 into an intermediate frequency signal as a serial signal. The parallel/serial converter 324 outputs a read request to the FIFO 322, and reads the data held in the FIFO 322. A signal of 0.5115 Msps as eight-bit width data, for example, is assumed as this data.

The FIFO remaining amount checking unit 323 checks a remaining amount of data held in the FIFO 322, and outputs the remaining amount to the rate adjusting unit 325. The rate adjusting unit 325 adjusts the rate of the intermediate frequency signal output from the parallel/serial converter 324 according to the remaining data amount output from the FIFO remaining amount checking unit 323. A difference in frequency can occur between a sampling clock in the high frequency signal receiving device 100 and a clock in the high frequency signal reradiating device 300 because source oscillators of the temperature-compensated crystal oscillators 140 and 340 are different from each other. Accordingly, on the basis of the remaining data amount of the FIFO which remaining data amount is detected in the FIFO remaining amount checking unit 323, the frequency difference is adjusted in the rate adjusting unit 325 from an excess or insufficiency of the remaining data amount.

Specifically, in a case where the oscillation frequency of the temperature-compensated crystal oscillator 340 of the high frequency signal reradiating device 300 is lower than the oscillation frequency of the temperature-compensated crystal oscillator 140 of the high frequency signal receiving device 100, the remaining data amount of the FIFO 322 gradually increases. In this case, the rate adjusting unit 325 performs an operation of thinning out data for one clock from time to time according to a change in the remaining amount.

In a case where the oscillation frequency of the temperature-compensated crystal oscillator 340 of the high frequency signal reradiating device 300 is higher than the oscillation frequency of the temperature-compensated crystal oscillator 140 of the high frequency signal receiving device 100, on the other hand, the remaining data amount of the FIFO 322 gradually decreases. In this case, the rate adjusting unit 325 performs an operation of inserting a zero value for one clock from time to time according to a change in the remaining amount.

The packet interpreting unit 320 thus performs synchronization processing. That is, the packet analyzing unit 321 interpolates dummy data for a missing part of the packet, and the rate adjusting unit 325 adjusts a frequency difference. Synchronization processing at a time of performing packet transmission between the high frequency signal receiving device 100 and the high frequency signal reradiating device 300 is thereby performed.

Incidentally, by oversampling the output data of the parallel/serial converter 324 for these operations, it is possible to suppress an amount of change in signal phase due to the thinning out and the zero value insertion.

The low-pass filter 326 is a filter that removes a high-frequency component of an output of the rate adjusting unit 325, and outputs the result as an intermediate frequency signal IF_out. Consequently, the transmission spectrum of the intermediate frequency signal can be suppressed so as not to spread. Incidentally, a signal of 4.092 Msps which signal is based on IQ modulation of eight bits on the I-channel and eight bits on the Q-channel, that is, a total of 16 bits, for example, is assumed as the intermediate frequency signal IF_out.

The control unit 329 controls the whole of the packet interpreting unit 320.

The RF transmitting unit 330 includes a DA converter 331, a low-pass filter 332, a variable gain amplifier 333, a mixer 334, a low-noise amplifier 335, a phase-locked loop circuit 336, a buffer 337, and a control unit 339.

The DA converter (DAC: Digital-to-Analog Converter) 331 is a circuit that converts the intermediate frequency signal IF_out as a digital signal output from the packet interpreting unit 320 into an analog signal.

The low-pass filter 332 is a filter that removes a high-frequency component of the output of the DA converter 331.

The variable gain amplifier 333 is an amplifier that amplifies an output of the low-pass filter 332 with a variable gain.

The phase-locked loop circuit 336 is a circuit that generates a phase-synchronized signal on the basis of the output of the temperature-compensated crystal oscillator 340. The mixer 334 is a circuit that converts the high frequency signal amplified by the variable gain amplifier 333 into a high frequency signal by mixing the high frequency signal with the signal from the phase-locked loop circuit 336.

The low-noise amplifier 335 is an amplifier that amplifies the high frequency signal output from the mixer 334.

The buffer 337 is a circuit that amplifies the output of the temperature-compensated crystal oscillator 340, and distributes the amplified output as a clock signal.

The control unit 339 controls the whole of the RF transmitting unit 330.

The host computer 350 controls the operation of the high frequency signal reradiating device 300. The host computer 350 connects to the control unit 329 for the packet interpreting unit 320, connects to the control unit 339 for the RF transmitting unit 330, and performs various kinds of settings, a monitoring operation, communication, and the like.

Operation Timing

Figure 6:
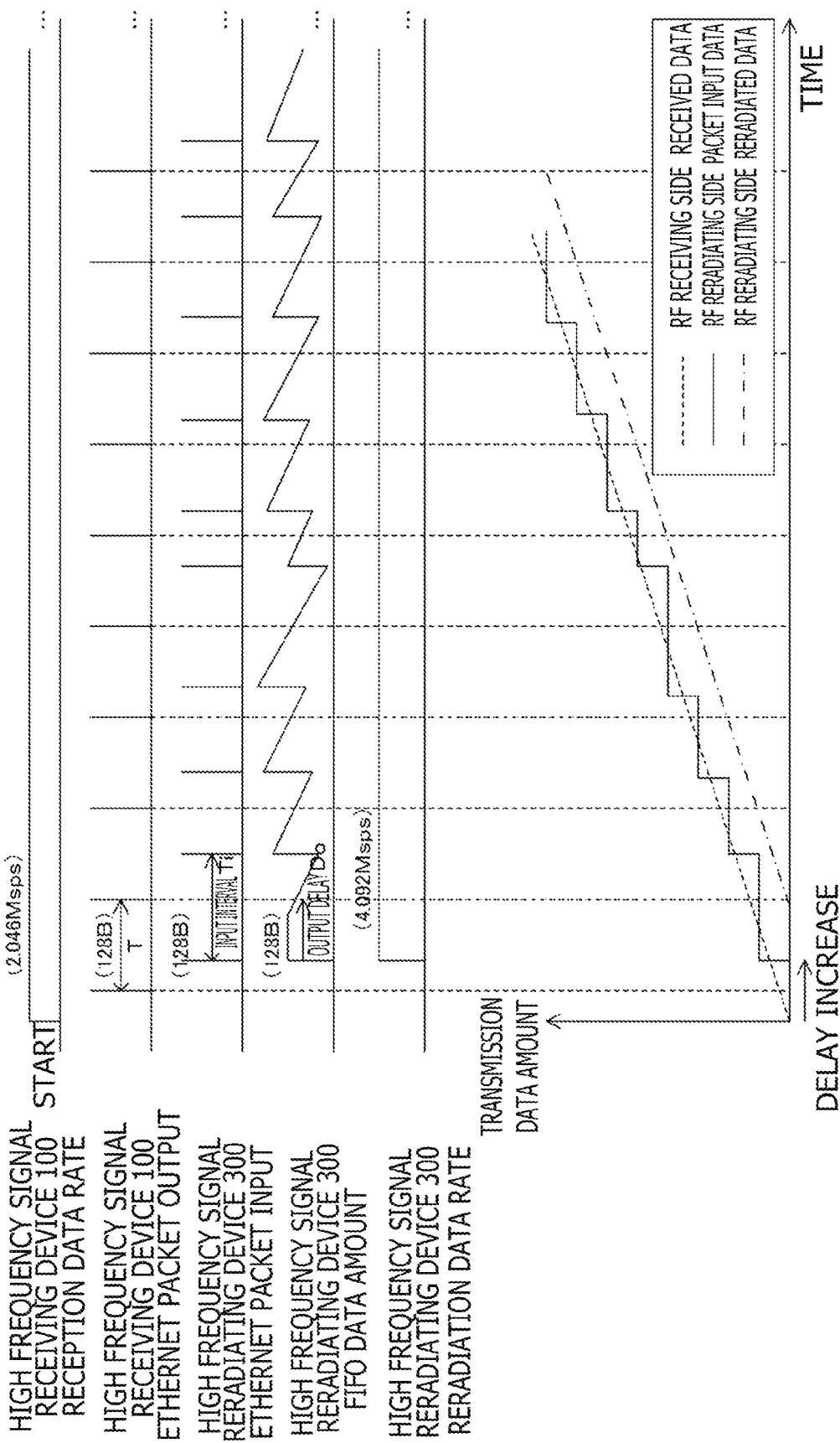
FIG. 6 is a diagram illustrating an example of operation without a packet loss in the wireless system in the first embodiment of the present technology.

FIG. 6 is a diagram illustrating an example of operation without a packet loss in the wireless system in the first embodiment of the present technology. Incidentally, numerical values illustrated here are an example.

Suppose that the high frequency signal receiving device 100 starts reception, and generates an intermediate frequency signal at a rate of 2.046 Msps, for example. Then, suppose that the high frequency signal receiving device 100 outputs packets at fixed output intervals Ts with 128 bytes as a unit, for example. The output intervals can be controlled in the high frequency signal receiving device 100.

The high frequency signal reradiating device 300 receives the packets via the communication path 200. However, variation in delay time occurs due to network operation of the communication path 200. The high frequency signal reradiating device 300 makes rate adjustment by temporarily holding the packets in the FIFO 322.

Here, letting Ti be a packet input interval, and letting Do be an output delay, it suffices for the data size of the FIFO 322 to be 256 bytes or less when a difference between the packet input interval Ti and the output delay Do is equal to or more than zero at all times, that is, when Ti−Do≥0 holds at all times.

In addition, when the difference exceeds an output interval T, that is, when Ti−Do>T is satisfied, an underflow in which the FIFO 322 becomes empty occurs, and interpolation processing becomes necessary. Therefore, control is performed so as to delay data output from the FIFO 322.

Consequently, the size of the FIFO 322 which size is set to such a degree as to be able to accommodate delay variation and the output delay enable reradiation to be performed without a data loss. That is, even when packet intervals vary, the high frequency signal reradiating device 300 can perform reradiation without an interruption while accurately maintaining a fixed delay time from the received data in the high frequency signal receiving device 100. Incidentally, when the size of the FIFO 322 is increased, a tolerance to delay variation is increased, but a delay from the reception of the high frequency signal receiving device 100 to the reradiation of the high frequency signal reradiating device 300 is increased.

Figure 7:
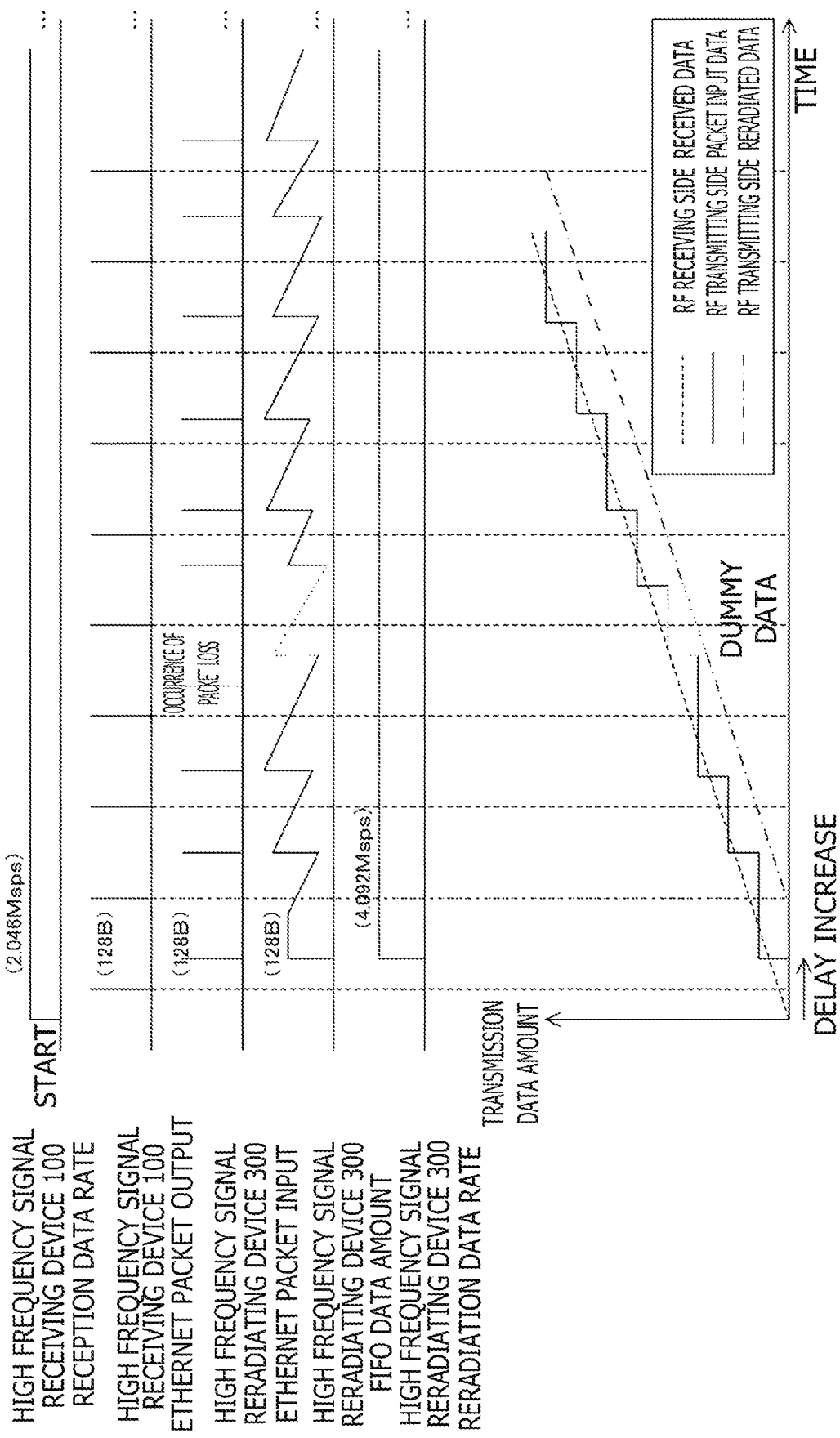
FIG. 7 is a diagram illustrating an example of operation with a packet loss in the wireless system in the first embodiment of the present technology.

FIG. 7 is a diagram illustrating an example of operation with a packet loss in the wireless system in the first embodiment of the present technology. Incidentally, numerical values illustrated here are similar to those of the example illustrated above.

In the present example, suppose that a packet loss is detected in the packet analyzing unit 321 of the high frequency signal reradiating device 300. When the remaining amount of the FIFO 322 becomes a certain value or less due to the occurrence of this packet loss, dummy data (for example, all zeros) of 128 bytes is inserted into the FIFO 322. In a case where a packet loss occurs consecutively, similar processing is repeated.

The sequence number of a packet received after the occurrence of the packet loss is checked. In the figure, a packet input delay is assumed to be T or less. However, in a case where T is exceeded, the size of the FIFO 322 and the output delay are increased.

As illustrated here, interpolation is performed by use of the dummy data at a time of the occurrence of a packet loss. The GNSS receivers 510 receiving a reradiated signal achieve synchronization by integration processing on a signal length of one milliseconds or more at the shortest, and are therefore not affected very much even when some packet losses occur. Even when there is a packet loss in the high frequency signal reradiating device 300, replacement with the dummy data is made only partially, and reradiation can be performed without an interruption while a fixed delay time from the received data in the high frequency signal receiving device 100 is accurately maintained.

Modification

Figure 8:
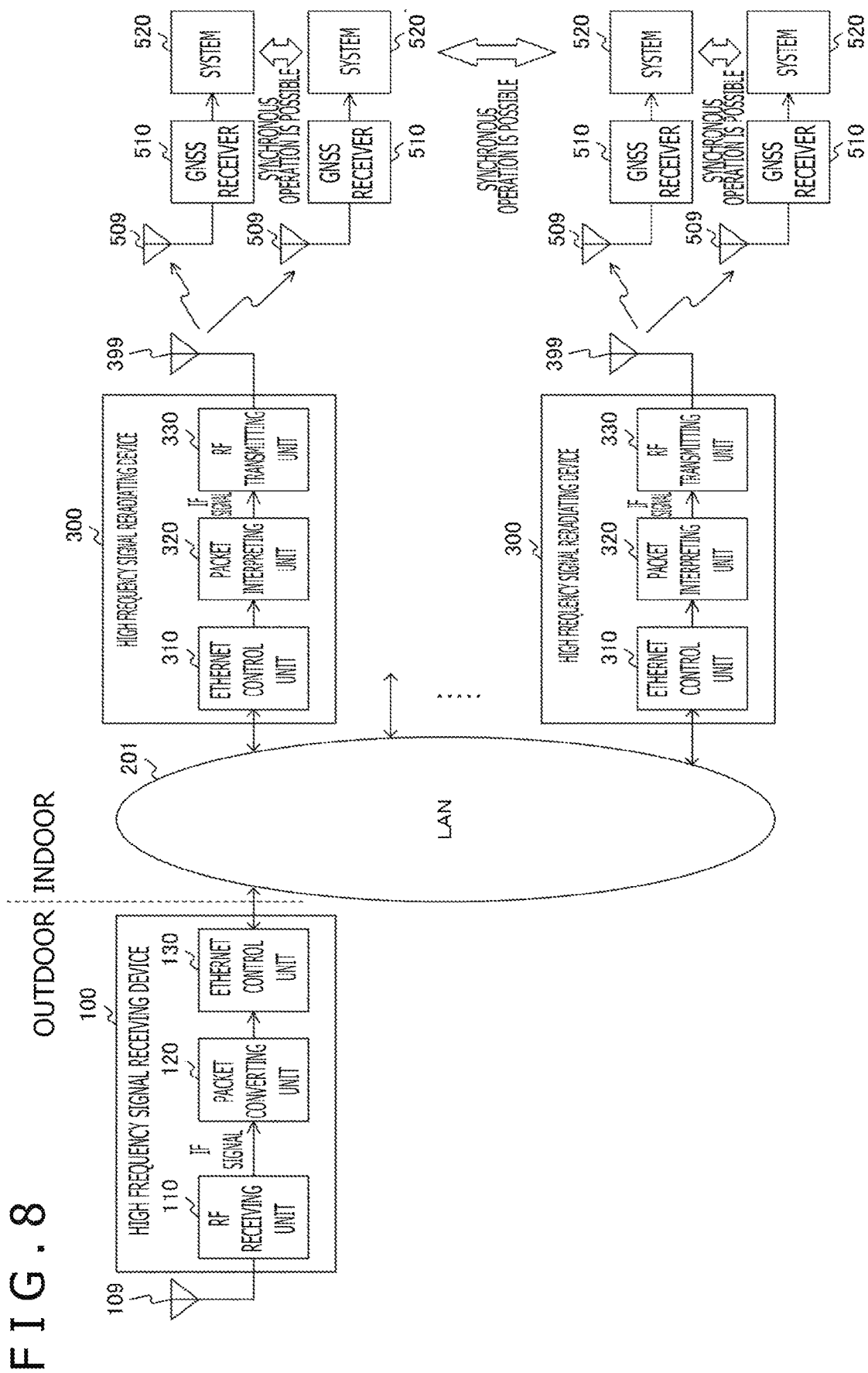
FIG. 8 is a diagram illustrating a modification of the wireless system in the first embodiment of the present technology.

FIG. 8 is a diagram illustrating a modification of the wireless system in the first embodiment of the present technology.

In the foregoing first embodiment, only one high frequency signal reradiating device 300 disposed indoors is illustrated. However, a plurality of high frequency signal reradiating devices 300 may be disposed. In that case, the plurality of high frequency signal reradiating devices 300 may be connected by use of, for example, a local area network (LAN) 201 as the communication path 200.

In this case, a plurality of GNSS receivers 510 receiving a GNSS signal from one high frequency signal reradiating device 300 can not only perform synchronous operation with each other but also perform synchronous operation with other GNSS receivers 510 receiving a GNSS signal from another high frequency signal reradiating device 300.

Thus, in the first embodiment of the present technology, the GNSS signal received in the high frequency signal receiving device 100 is packetized and transmitted through the communication path 200, and is returned to the GNSS signal in the high frequency signal reradiating device 300 and reradiated therefrom. Consequently, the GNSS receivers 510 can use the GNSS signal also indoors.

2. Second Embodiment

In the foregoing first embodiment, the GNSS signal is packetized as it is and then transmitted. However, in the following embodiment, an indoor positioning signal is generated, and the indoor positioning signal is packetized and transmitted. This indoor positioning signal is a signal loaded with time information synchronized with a time pulse 1PPS (Pulse Per Second) accurately synchronized with a GNSS clock. Here, 1PPS is a pulse signal train having one second intervals which pulse signal train is synchronized with the highly accurate time of the GNSS satellites 10, and 1PPS is a signal synchronized with exact seconds. As a format of this indoor positioning signal, an iPNT (indoor Position, Navigation, Timing) format, for example, may be used, and an original format may be used.

GNSS receivers 510 capable of receiving not only a GNSS signal but also this indoor positioning signal are assumed. Incidentally, the general configuration of the wireless system is similar to that of the foregoing first embodiment, and therefore detailed description thereof will be omitted.

Wireless System

Figure 9:
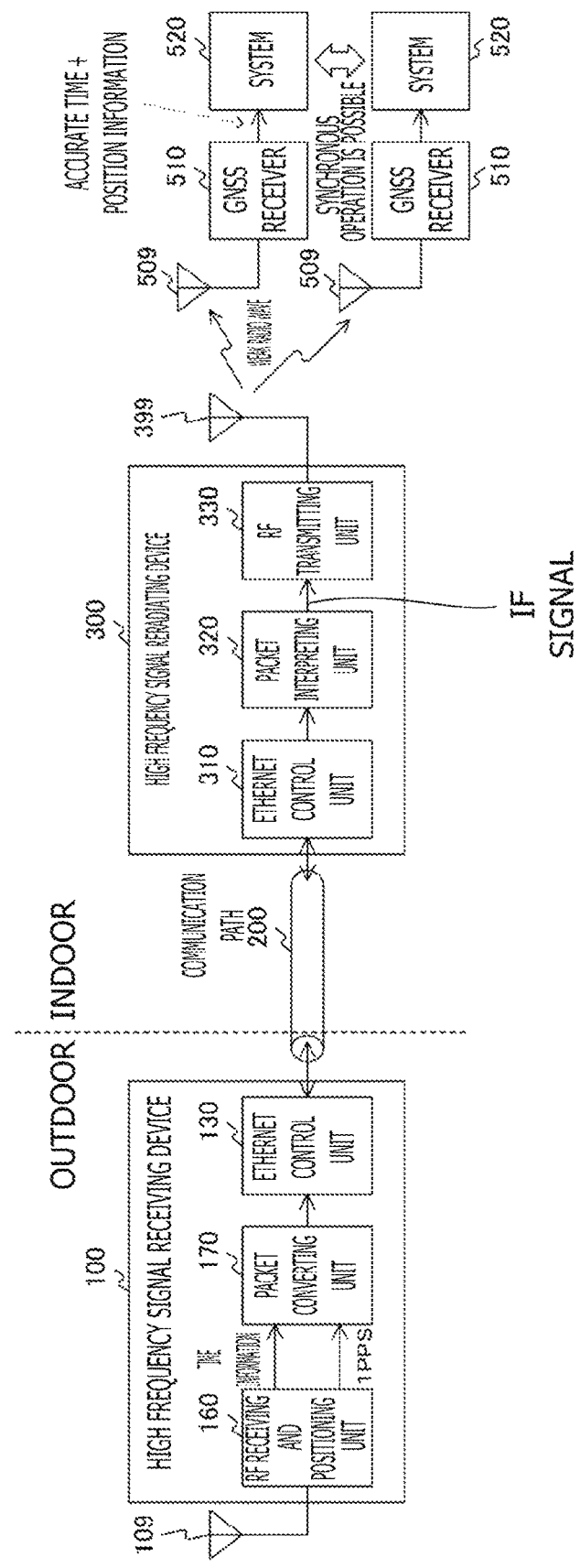
FIG. 9 is a diagram illustrating an example of a configuration of a wireless system in a second embodiment of the present technology.

FIG. 9 is a diagram illustrating an example of a configuration of a wireless system in a second embodiment of the present technology.

The high frequency signal receiving device 100 includes an RF receiving and positioning unit 160, a packet converting unit 170, and an Ethernet control unit 130.

The RF receiving and positioning unit 160 performs positioning on the basis of a GNSS signal as a high frequency signal received via the antenna 109, and obtains accurate time information synchronized with the GNSS satellites 10. The RF receiving and positioning unit 160 outputs the obtained time information and the time pulse 1PPS.

The packet converting unit 170 generates an intermediate frequency signal of an indoor positioning signal from the time information and 1PPS output from the RF receiving and positioning unit 160, and converts the intermediate frequency signal into a packet to be sent out to the Ethernet.

The Ethernet control unit 130 is similar to that of the foregoing first embodiment. The Ethernet control unit 130 sends out the packet converted by the packet converting unit 170 to the communication path 200.

In addition, the communication path 200 and the high frequency signal reradiating device 300 are similar to those of the foregoing first embodiment. In this case, the high frequency signal reradiating device 300 transmits the indoor positioning signal, rather than the GNSS signal itself, as a high frequency signal. Incidentally, the indoor positioning signal in this case can use the same frequency (for example, 1575.42 MHz) as the GNSS signal. Also in this case, a weak radio wave suffices as a signal used for reradiation, and therefore the signal does not affect other apparatuses.

The GNSS receivers 510 can receive the indoor positioning signal transmitted from the high frequency signal reradiating device 300, and perform time synchronization on the basis of a start timing of a received message and the time information.

(High Frequency Signal Receiving Device)

Figure 10:
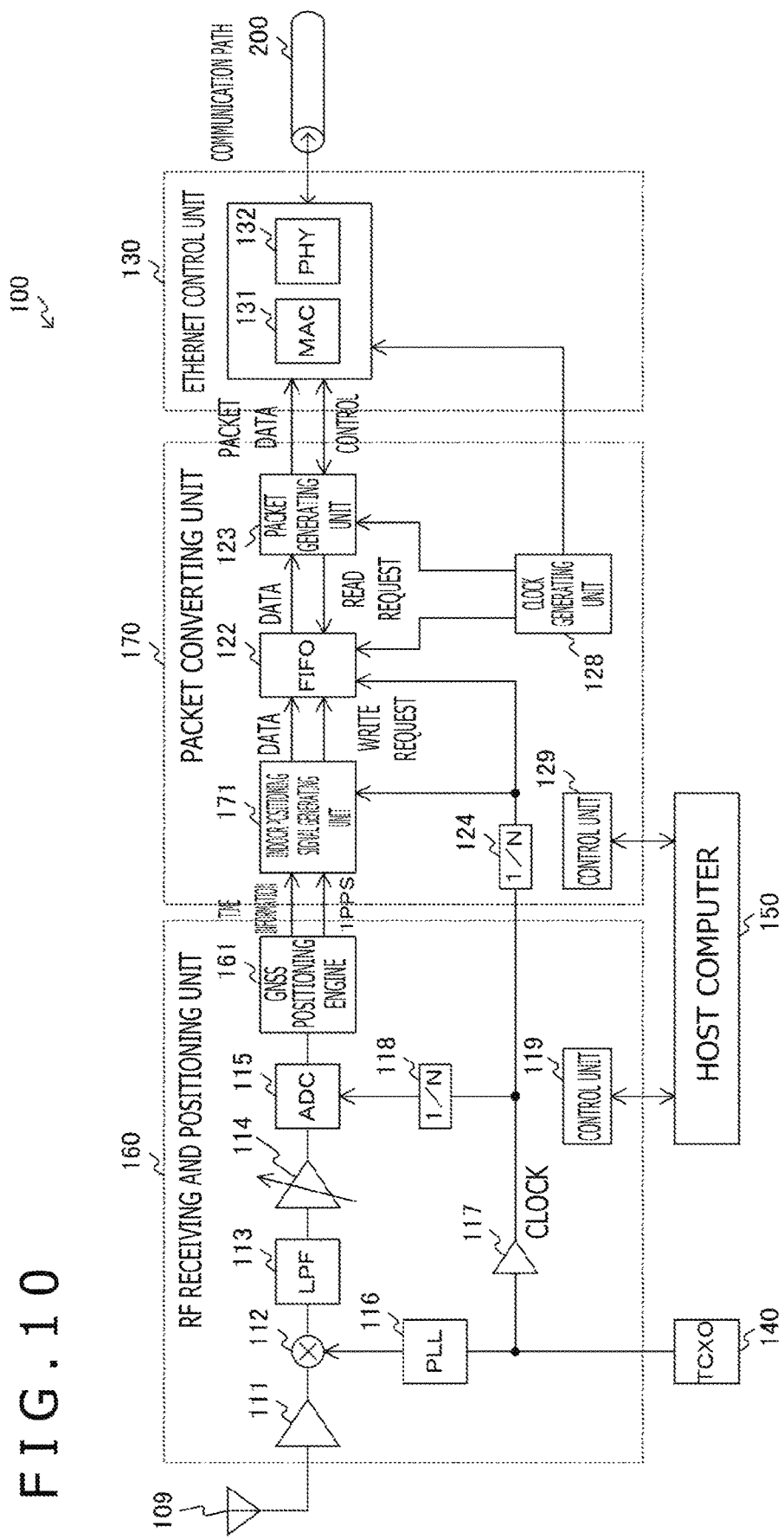
FIG. 10 is a diagram illustrating an example of a configuration of a high frequency signal receiving device 100 in the second embodiment of the present technology.

FIG. 10 is a diagram illustrating an example of a configuration of the high frequency signal receiving device 100 in the second embodiment of the present technology.

As described above, the high frequency signal receiving device 100 in the second embodiment includes the RF receiving and positioning unit 160, the packet converting unit 170, and the Ethernet control unit 130. The high frequency signal receiving device 100 also includes a temperature-compensated crystal oscillator 140 and a host computer 150.

As with the RF receiving unit 110 in the foregoing first embodiment, the RF receiving and positioning unit 160 includes a low-noise amplifier 111, a mixer 112, a low-pass filter 113, a variable gain amplifier 114, an AD converter 115, a phase-locked loop circuit 116, a buffer 117, a frequency divider 118, and a control unit 119. In addition, the RF receiving and positioning unit 160 further includes a GNSS positioning engine 161.

The GNSS positioning engine 161 performs positioning on the basis of a received GNSS signal, and outputs accurate time information and 1PPS synchronous with the time of the GNSS satellites 10. Here, a text sentence based on a format compliant with an NMEA 0183 standard, for example, may be output as the time information. In this case, the time information may include the date and hour, minute, and second of UTC (Universal Time Coordinated).

As with the packet converting unit 120 in the foregoing first embodiment, the packet converting unit 170 includes a FIFO 122, a packet generating unit 123, a frequency divider 124, a clock generating unit 128, and a control unit 129. In addition, the packet converting unit 170 includes an indoor positioning signal generating unit 171.

The indoor positioning signal generating unit 171 generates an intermediate frequency signal of an indoor positioning signal on the basis of the time information and 1PPS output from the GNSS positioning engine 161. A one-bit signal of 2.046 Msps, for example, is assumed as the intermediate frequency signal of the indoor positioning signal. The indoor positioning signal generated by the indoor positioning signal generating unit 171 is held in the FIFO 122 according to a write request. The write operations of the indoor positioning signal generating unit 171 and the FIFO 122 operate in synchronism with a clock signal from the frequency divider 124.

The packet generating unit 123 outputs a read request to the FIFO 122, reads data held in the FIFO 122, and generates a packet. When the packet generating unit 123 adds the time of packet transmission start timing as information in the packetization, the high frequency signal reradiating device 300 can obtain the time of packet transmission by analyzing the packet.

In addition, when the packet generating unit 123 adds the presence or absence of 1PPS timing in the packet and which bit in the packet corresponds to the 1PPS timing as information in the packetization, the high frequency signal reradiating device 300 can obtain the 1PPS timing by analyzing the packet. For example, supposing that the intermediate frequency signal of the packet is 128 bytes, it suffices to add 1 bit indicating the presence or absence of 1PPS timing and 10 bits of the 1PPS timing, that is, a total of 11 bits.

Operation Timing

Figure 11:
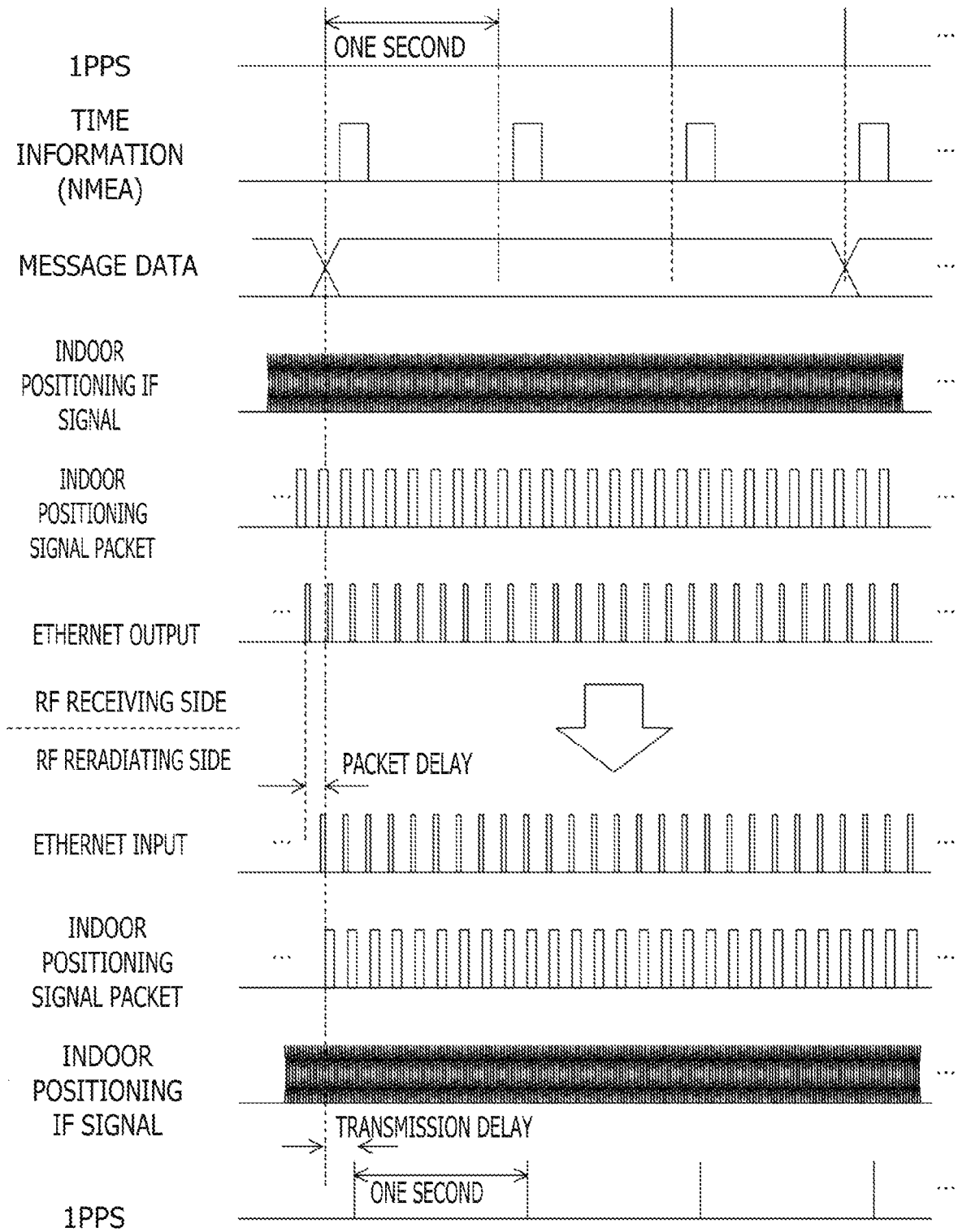
FIG. 11 is a diagram illustrating an example of operation of the wireless system in the second embodiment of the present technology.

FIG. 11 is a diagram illustrating an example of operation of the wireless system in the second embodiment of the present technology.

Receiving 1PPS and the time information, the indoor positioning signal generating unit 171 can tick accurate time by configuring a counter that finely ticks 1PPS intervals, and making a time setting coinciding with the timing of 1PPS from the time information.

The packet generating unit 123 generates message data including accurate time according to the format of the indoor positioning signal, and packetizes an EOR of the message data and a spread code as an intermediate frequency signal. The message data includes a preamble, a message start time, position information, delay correction information, and the like. Incidentally, in the present example, it is assumed that the time information is updated once in three seconds.

The Ethernet control unit 130 outputs the packetized signal to the communication path 200. As is understood from the figure, the transmission rate of the Ethernet of the communication path 200 is sufficiently higher than the rate of the original intermediate frequency signal, and therefore Ethernet transmission has much idle time.

The high frequency signal reradiating device 300 extracts the packet from an Ethernet input, and returns the packet to the original intermediate frequency signal. Even when packet input intervals vary, the variations are accommodated by the FIFO 322 in the packet interpreting unit 320, and the intermediate frequency signal is reproduced at a fixed rate without an interruption. In addition, in a case where the timing information of 1PPS is added to the packet, 1PPS can also be reproduced easily.

Thus, the second embodiment of the present technology generates the indoor positioning signal from the GNSS signal received in the high frequency signal receiving device 100, packetizes the indoor positioning signal, and transmits the packet through the communication path 200, and returns the packet to the indoor positioning signal in the high frequency signal reradiating device 300 and reradiates the indoor positioning signal. Consequently, the GNSS receivers 510 can use the indoor positioning signal also indoors.

3. Third Embodiment

In the foregoing second embodiment, the indoor positioning signal obtained from the GNSS signal is packetized and transmitted. In this third embodiment, the high frequency signal receiving device 100 measures a delay time between the high frequency signal receiving device 100 and the high frequency signal reradiating device 300, and reflects corrected time information in a packet.

Wireless System

Figure 12:
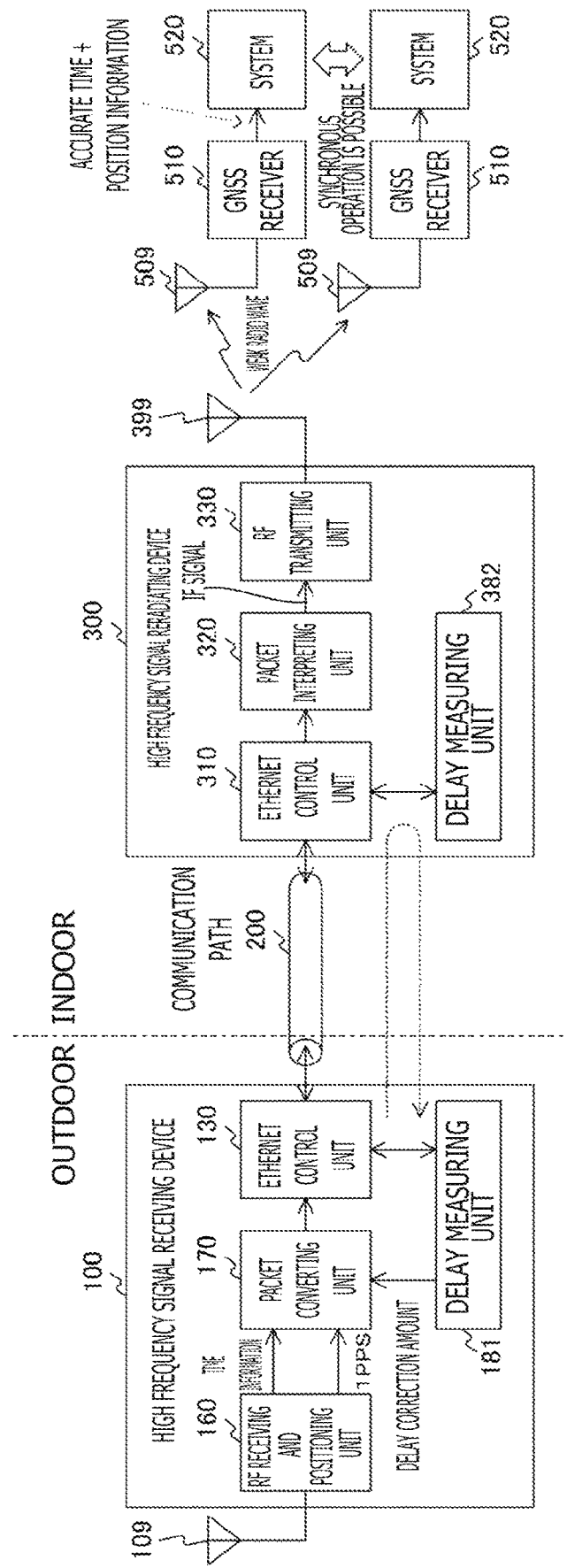
FIG. 12 is a diagram illustrating an example of a configuration of a wireless system in a third embodiment of the present technology.

FIG. 12 is a diagram illustrating an example of a configuration of a wireless system in the third embodiment of the present technology.

In this third embodiment, the high frequency signal receiving device 100 includes a delay measuring unit 181. In addition, the high frequency signal reradiating device 300 includes a delay measuring unit 382. Other configurations are basically similar to those of the foregoing second embodiment.

The delay measuring unit 181 measures a round trip time by performing two-way communication of delay measurement packets with the delay measuring unit 382, and obtains a delay correction amount. The packet converting unit 170 shifts a start of message data forward by the delay correction amount. Consequently, delays in the GNSS receivers 510 are corrected, and the accuracy of time synchronization can be improved. In addition, by adding an obtained delay time to the packet of the indoor positioning signal, the packet converting unit 170 can correct the amount of the delay time.

Figure 13:
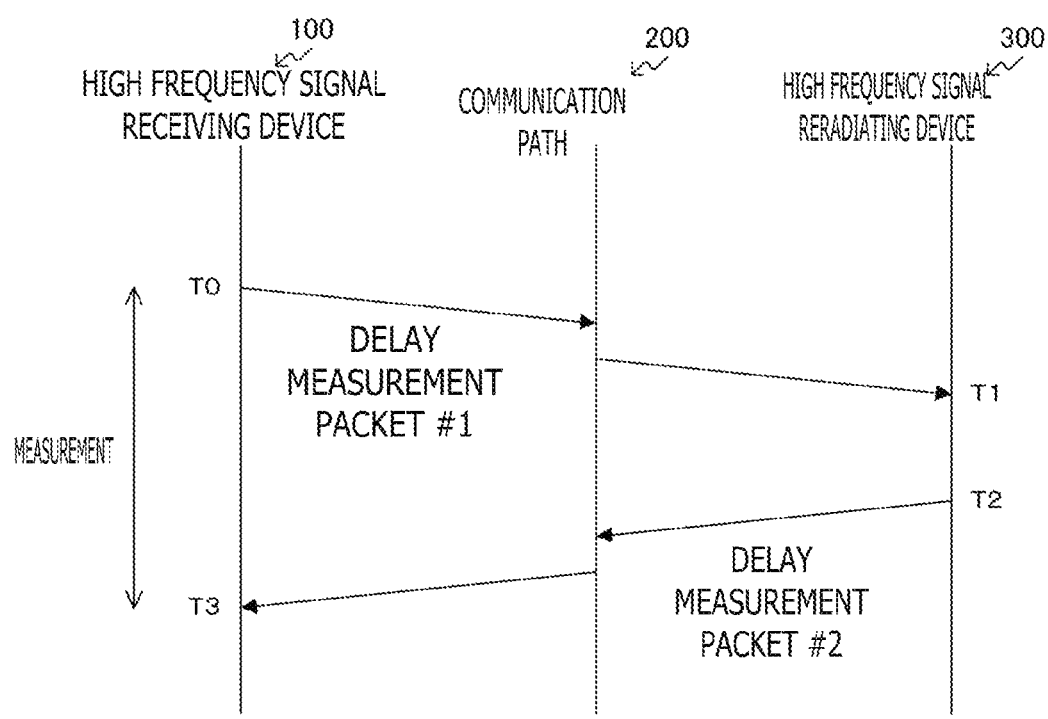
FIG. 13 is a diagram illustrating an example of a sequence of delay time measurement in the third embodiment of the present technology.

FIG. 13 is a diagram illustrating an example of a sequence of delay time measurement in the third embodiment of the present technology.

The delay measuring unit 181 of the high frequency signal receiving device 100 measures the round trip time by two-way communication of delay measurement packets. Specifically, the delay measuring unit 181 outputs a delay measurement packet #1 to the communication path 200 at time T0, and thereafter measures time T3 at which a delay measurement packet #2 is received from the high frequency signal reradiating device 300. In addition, time T1 at which the delay measurement packet #1 is received in the high frequency signal reradiating device 300 and time T2 at which the delay measurement packet #1 is output to the communication path 200 are obtained. Consequently, a round trip time TX can be obtained.

$$TX = T3 - T0 - (T2 - T1)$$

Consequently, a delay correction amount DA can be obtained on the basis of the value of half of the round trip time TX.

Here, the delay measurement packets used in the two-way communication each include a header and measurement information. Here, the measurement information includes an identification number, a transmission start time time stamp, and a reception start time time stamp.

Incidentally, the delay time varies, and therefore an error in time synchronization can be reduced by performing measurement a plurality of times and taking an average or a median value, for example.

The high frequency signal reradiating device 300, for example, delays the output of the intermediate frequency signal such that a total delay amount becomes a fixed value with respect to the obtained delay correction amount. Consequently, delays in the GNSS receivers 510 become a fixed value, and the accuracy of time synchronization can be improved.

Operation Timing

Figure 14:
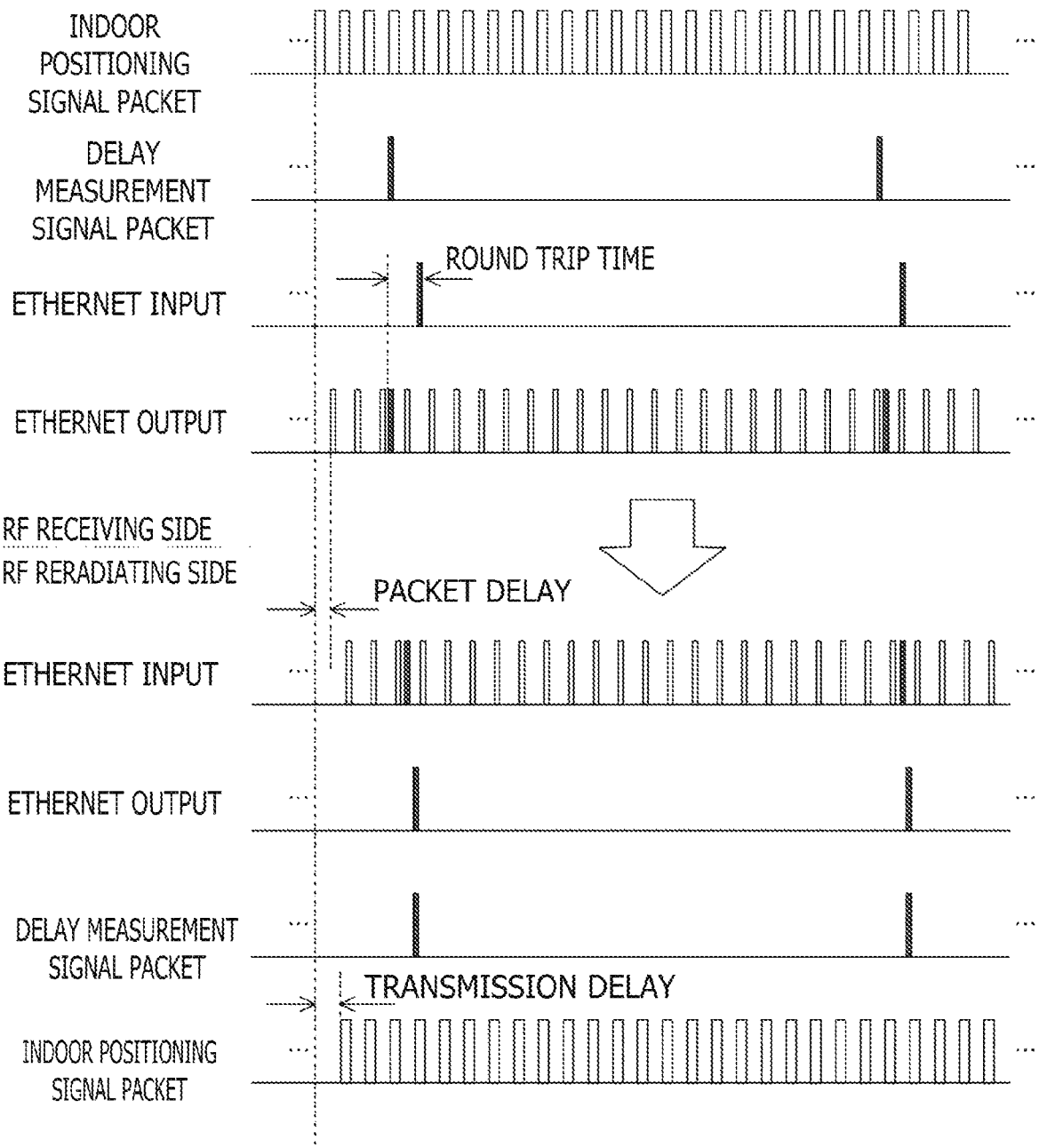
FIG. 14 is a diagram illustrating an example of operation of the wireless system in the third embodiment of the present technology.

FIG. 14 is a diagram illustrating an example of operation of the wireless system in the third embodiment of the present technology.

The high frequency signal receiving device 100 transmits the delay measurement packet #1 during an interval between packets of the indoor positioning signal.

The high frequency signal reradiating device 300 returns the delay measurement packet #2 with time stamps of a reception start time T1 and a transmission start time T2 added thereto.

Incidentally, while a plurality of delay measurements is performed in the figure, the delay does not change as long as packets are transmitted consecutively, and therefore only a first delay measurement may be performed. However, in the case of UDP transmission, even when a large number of packet losses occur consecutively in the high frequency signal reradiating device 300, the high frequency signal receiving device 100 cannot detect the packet losses. In order for the high frequency signal reradiating device 300 to be restored in such a case, the high frequency signal receiving device 100 desirably performs delay measurement periodically.

Thus, according to the third embodiment of the present technology, the delay measuring unit 181 can measure the round trip time by performing two-way communication of delay measurement packets with the delay measuring unit 382, and correct the delay time.

4. Fourth Embodiment

In the foregoing third embodiment, the delay time between the high frequency signal receiving device 100 and the high frequency signal reradiating device 300 is measured from the high frequency signal receiving device 100. However, in this fourth embodiment, the delay time between the high frequency signal receiving device 100 and the high frequency signal reradiating device 300 is measured from the high frequency signal reradiating device 300.

Wireless System

Figure 15:
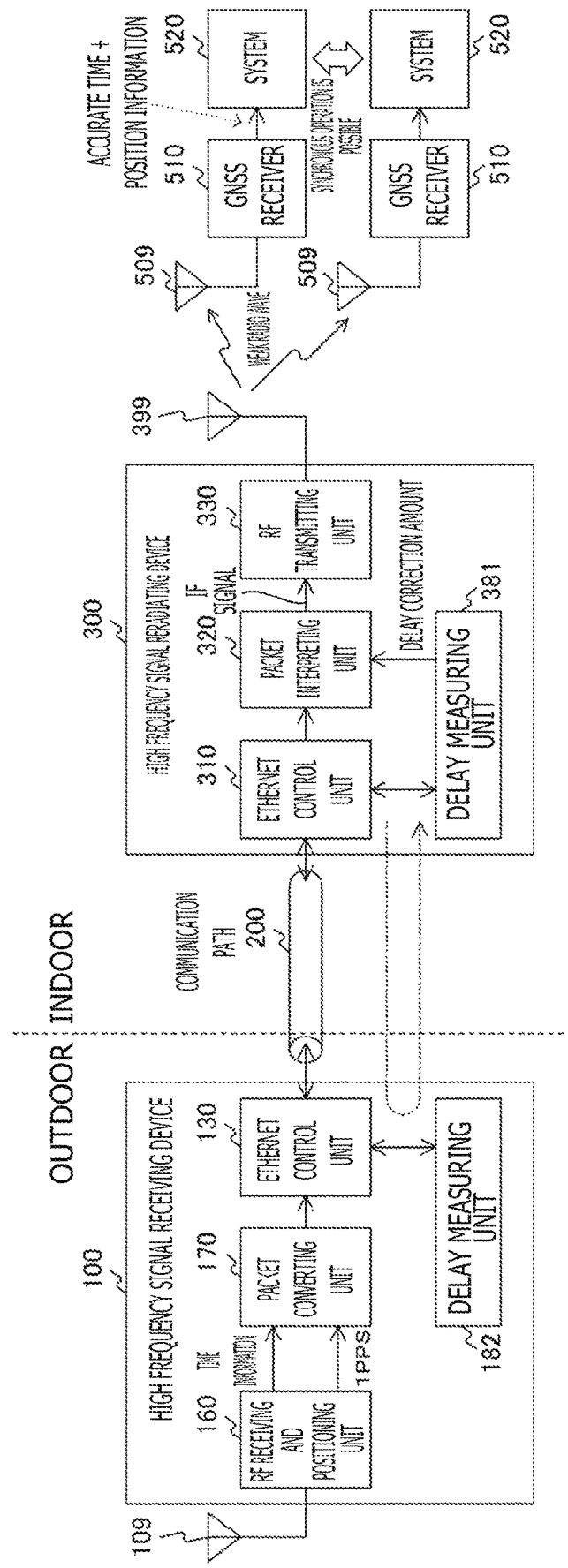
FIG. 15 is a diagram illustrating an example of a configuration of a wireless system in a fourth embodiment of the present technology.

FIG. 15 is a diagram illustrating an example of a configuration of a wireless system in the fourth embodiment of the present technology.

In the present fourth embodiment, the high frequency signal receiving device 100 includes a delay measuring unit 182. In addition, the high frequency signal reradiating device 300 includes a delay measuring unit 381. Other configurations are basically similar to those of the foregoing second embodiment.

The delay measuring unit 381 measures a round trip time by performing two-way communication of delay measurement packets with the delay measuring unit 182, and obtains a delay correction amount. The high frequency signal reradiating device 300, for example, delays the output of the intermediate frequency signal such that a total delay amount is a fixed value with respect to the obtained delay correction amount. Consequently, delays in the GNSS receivers 510 become a fixed value, and the accuracy of time synchronization can be improved.

Figure 16:
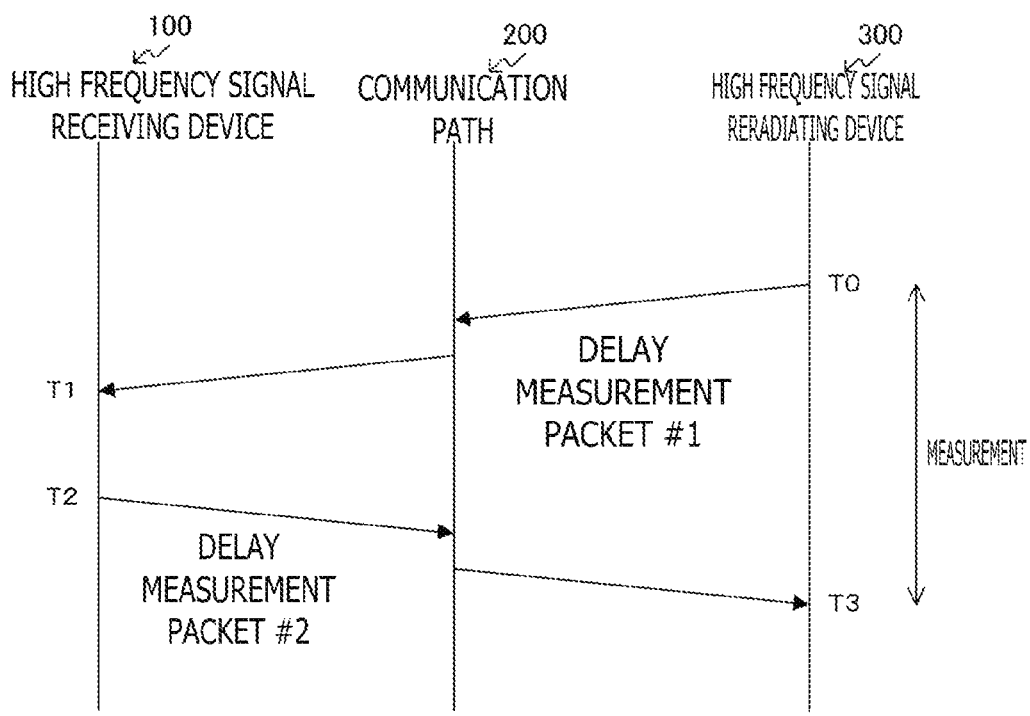
FIG. 16 is a diagram illustrating an example of a sequence of delay time measurement in the fourth embodiment of the present technology.

FIG. 16 is a diagram illustrating an example of a sequence of delay time measurement in the fourth embodiment of the present technology.

The delay measuring unit 381 of the high frequency signal reradiating device 300 measures the round trip time by two-way communication of delay measurement packets. Specifically, the delay measuring unit 381 outputs a delay measurement packet #1 to the communication path 200 at time T0, and thereafter measures time T3 at which a delay measurement packet #2 is received from the high frequency signal receiving device 100. In addition, time T1 at which the delay measurement packet #1 is received in the high frequency signal receiving device 100 and time T2 at which the delay measurement packet #1 is output to the communication path 200 are obtained. Consequently, a round trip time TX can be obtained. Consequently, as in the foregoing third embodiment, a delay correction amount DA can be obtained on the basis of the value of half of the round trip time TX.

Operation Timing

Figure 17:
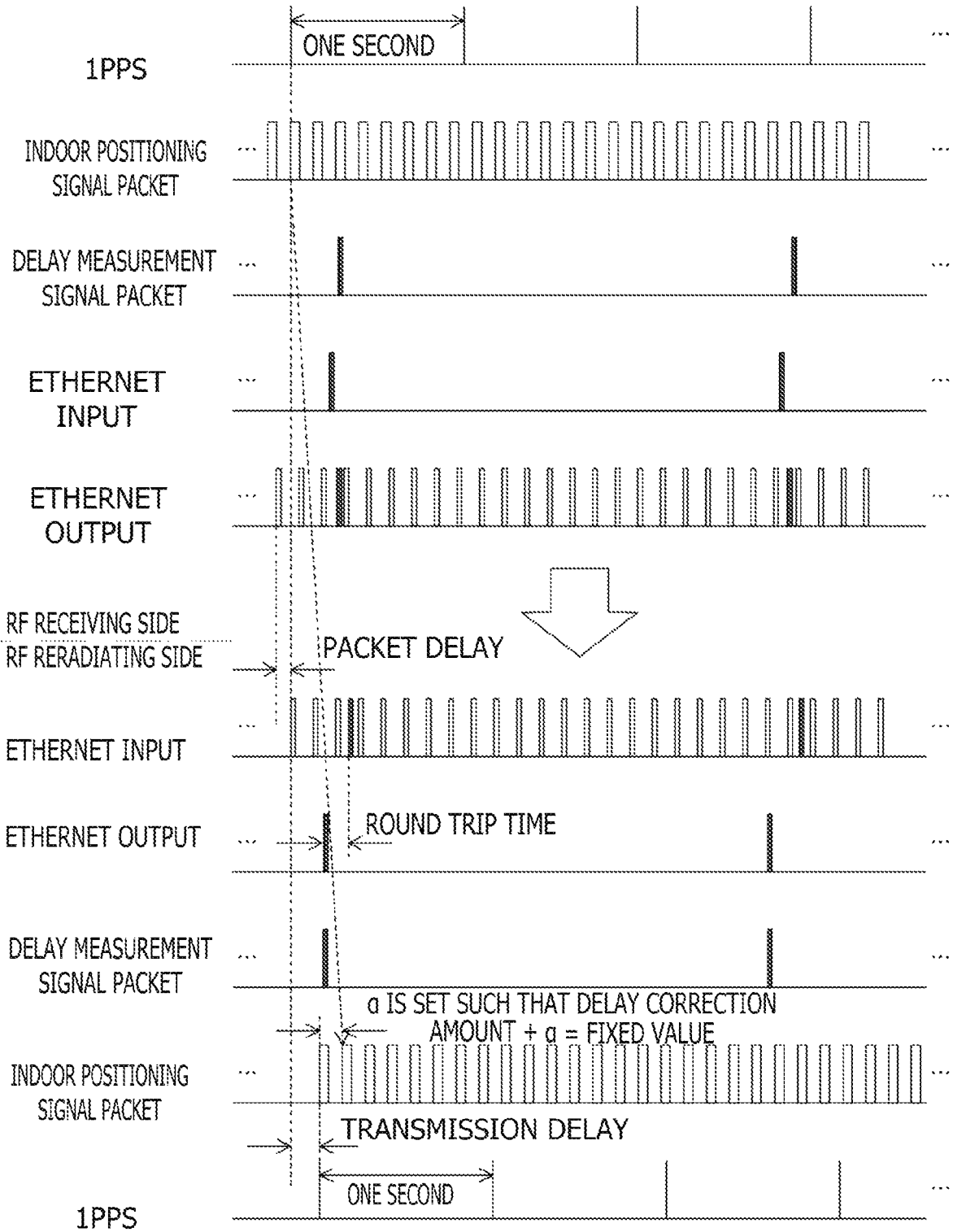
FIG. 17 is a diagram illustrating an example of operation of the wireless system in the fourth embodiment of the present technology.

FIG. 17 is a diagram illustrating an example of operation of the wireless system in the fourth embodiment of the present technology.

The high frequency signal reradiating device 300 transmits the delay measurement packet #1 during an interval between packets of the indoor positioning signal.

The high frequency signal receiving device 100 returns the delay measurement packet #2 with time stamps of a reception start time T1 and a transmission start time T2 added thereto.

The packet interpreting unit 320, for example, delays the output of the intermediate frequency signal by setting a delay amount a such that a total delay amount becomes a fixed value with respect to the obtained delay correction amount with 1PPS as a reference.

Incidentally, while a plurality of delay measurements is performed in the figure, the delay does not change as long as packets are transmitted consecutively, and therefore only a first delay measurement may be performed. However, in a case where a large number of packet losses occur consecutively in the high frequency signal reradiating device 300, delay measurement is desirably performed in order for the high frequency signal reradiating device 300 to be restored.

Thus, according to the fourth embodiment of the present technology, the delay measuring unit 381 can measure the round trip time by performing two-way communication of delay measurement packets with the delay measuring unit 182, and correct the delay time.

5. Fifth Embodiment

In the foregoing fourth embodiment, the output of the intermediate frequency signal is delayed with 1PPS as a reference. However, in this fifth embodiment, delay correction is made from a packet delay without the use of 1PPS.

Wireless System

Figure 18:
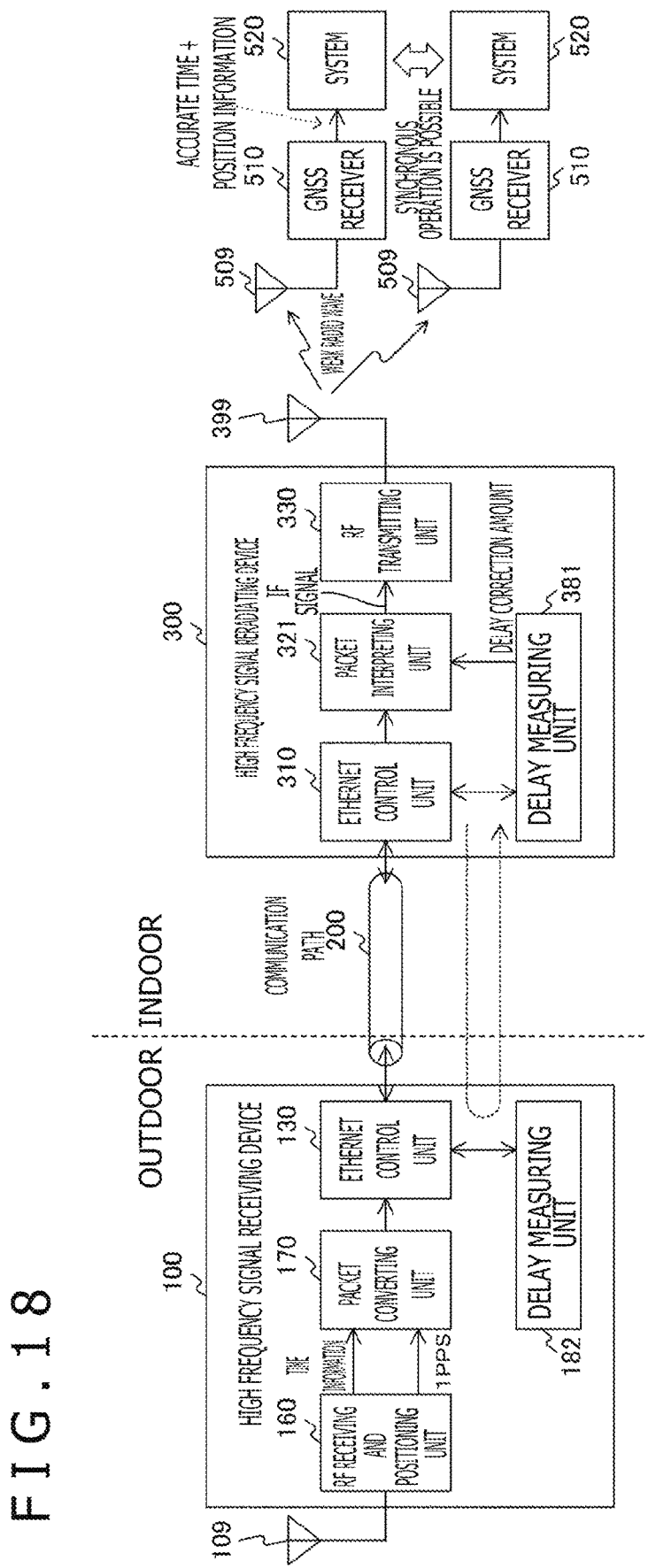
FIG. 18 is a diagram illustrating an example of a configuration of a wireless system in a fifth embodiment of the present technology.

FIG. 18 is a diagram illustrating an example of a configuration of a wireless system in the fifth embodiment of the present technology.

This fifth embodiment has a configuration similar to that of the foregoing fourth embodiment. However, the high frequency signal reradiating device 300 includes a packet interpreting unit 360, and the processing of delaying the output of the intermediate frequency signal differs.

The delay measuring unit 381 measures a round trip time by performing two-way communication of delay measurement packets with the delay measuring unit 182, and obtains a delay correction amount. The content of delay measurement is similar to that of the foregoing fourth embodiment.

Operation Timing

Figure 19:
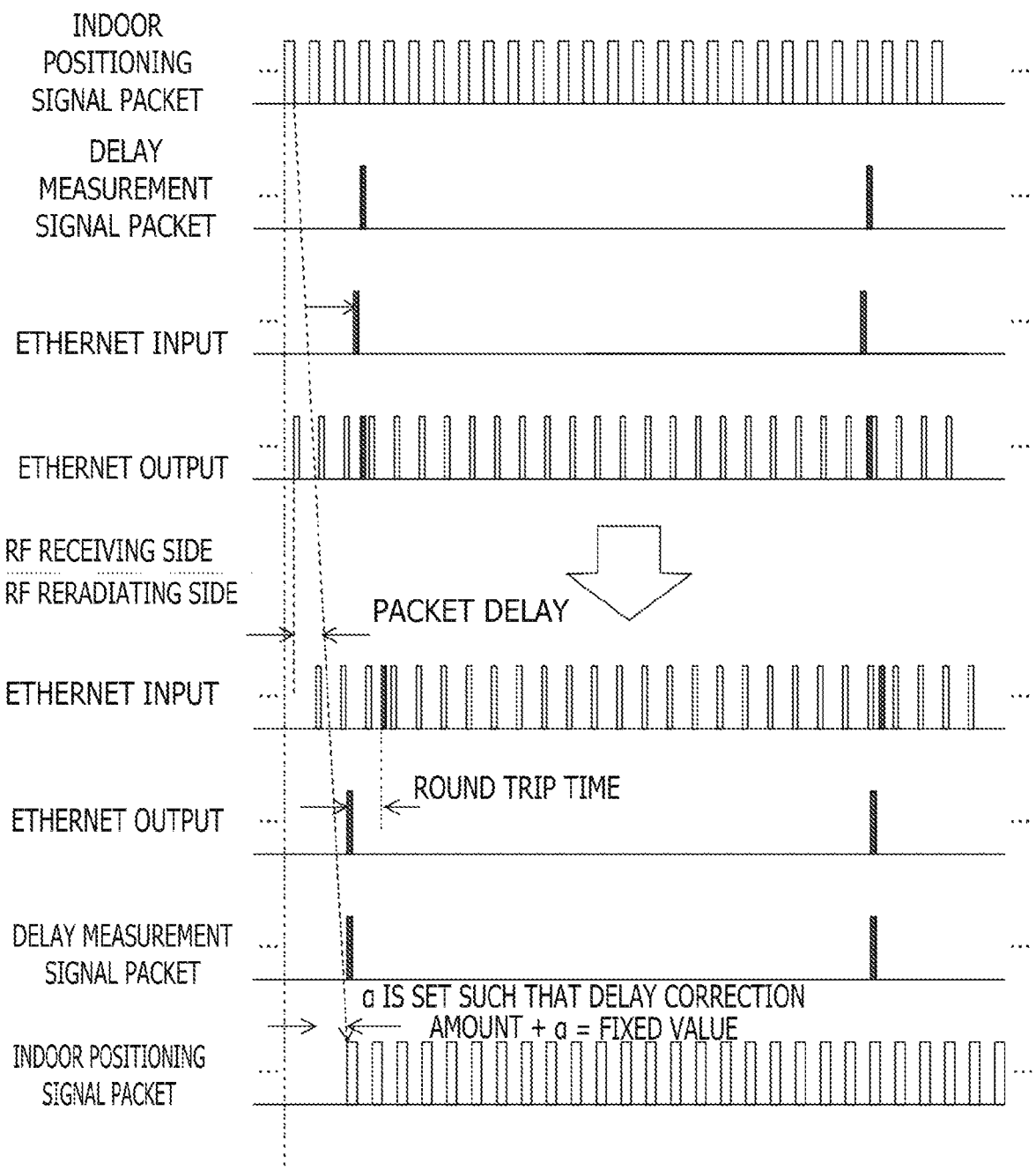
FIG. 19 is a diagram illustrating an example of operation of the wireless system in the fifth embodiment of the present technology.

FIG. 19 is a diagram illustrating an example of operation of the wireless system in the fifth embodiment of the present technology.

On the basis of time information obtained from a packetized indoor positioning signal and the correction delay amount measured by the delay measuring unit 381, the packet interpreting unit 360 generates the indoor positioning signal loaded with delay-corrected time information. That is, the packet interpreting unit 360 delays the output of the intermediate frequency signal by setting a delay amount a such that a total delay amount becomes a fixed value with respect to the obtained delay correction amount with a packet transmission start time as a reference.

Thus, according to the fifth embodiment of the present technology, a delay time can be corrected from a packet delay without the use of 1PPS.

6. Sixth Embodiment

In the foregoing third to fifth embodiments, the delay correction amount is obtained by performing two-way communication of delay measurement packets. In this sixth embodiment, a delay amount adjustment is made by use of a beacon synchronized with 1PPS.

Wireless System

Figure 20:
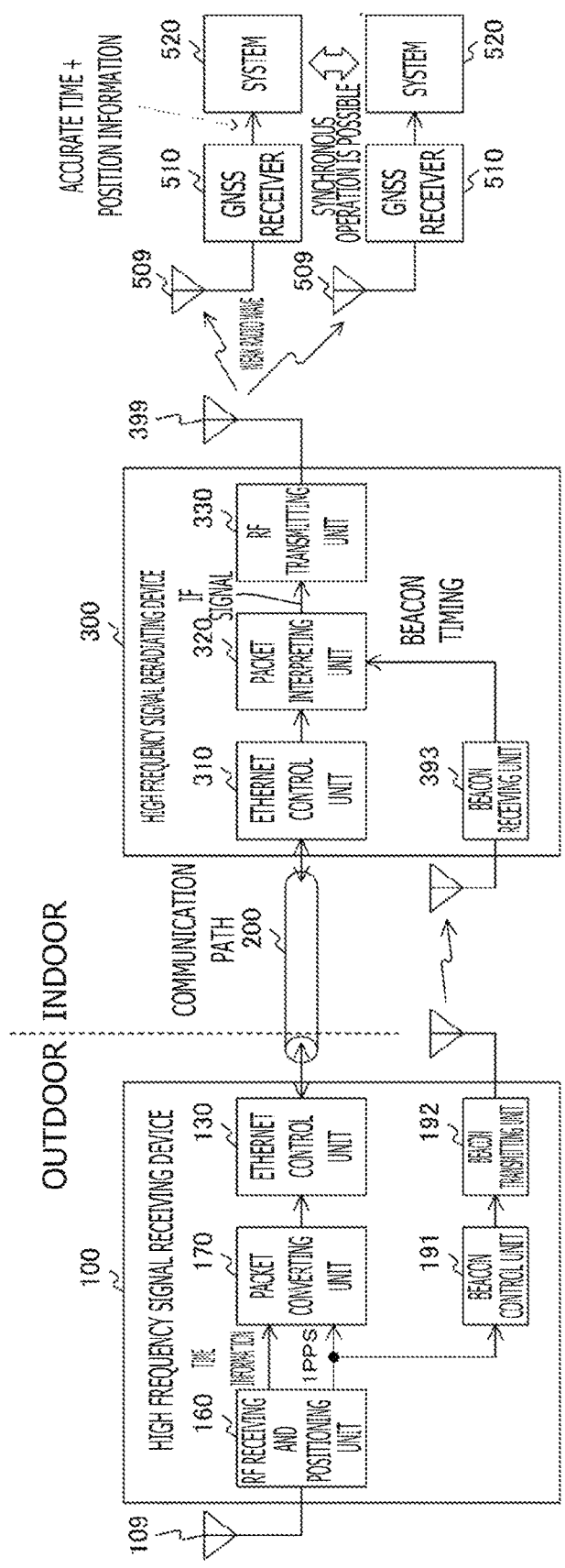
FIG. 20 is a diagram illustrating an example of a configuration of a wireless system in a sixth embodiment of the present technology.

FIG. 20 is a diagram illustrating an example of a configuration of a wireless system in a sixth embodiment of the present technology.

In this sixth embodiment, the high frequency signal receiving device 100 includes a beacon control unit 191 and a beacon transmitting unit 192. In addition, the high frequency signal reradiating device 300 includes a beacon receiving unit 393. Other configurations are basically similar to those of the foregoing second embodiment.

The beacon control unit 191 generates a beacon synchronized with 1PPS output from the RF receiving and positioning unit 160. The beacon transmitting unit 192 transmits the beacon synchronized with 1PPS.

The beacon receiving unit 393 receives the beacon transmitted from the beacon transmitting unit 192, and supplies beacon timing synchronized with 1PPS to the packet interpreting unit 320.

Operation Timing

FIG. 21 is a diagram illustrating an example of operation of the wireless system in the sixth embodiment of the present technology.

The packet interpreting unit 320, for example, delays the output of the intermediate frequency signal such that a delay amount becomes a fixed value with respect to the beacon timing synchronized with 1PPS with 1PPS as a starting point. Consequently, delays in the GNSS receivers 510 become a fixed value, and the accuracy of time synchronization can be improved.

Thus, according to the sixth embodiment of the present technology, the delay amount can be adjusted by use of the beacon synchronized with 1PPS.

7. Seventh Embodiment

In a case where reradiation is performed indoors as in each of the foregoing embodiments, an inconvenience may occur when a distinction between the indoors and the outdoors cannot be made. That is, because the reradiation of a GNSS signal is delayed from the signal received outdoors, a shift in time synchronization occurs in a GNSS receiver 510 moving from the outdoors to the indoors or from the indoors to the outdoors. At that time, when there is a large time difference between the indoors and the outdoors, switching between the indoors and the outdoors takes time, and there is a possibility of performing processing of regarding the time difference as invalid, and not trusting the time difference, for example.

Therefore, in this seventh embodiment, the GNSS receiver 510 makes a distinction between direct reception from a satellite and reradiation reception. In a case of direct reception, the GNSS signal is lower than thermal noise, and therefore the output of the AD converter of the GNSS receiver 510 is at a fixed level. In a case of reradiation, however, the output of the AD converter temporally varies depending on a distance from the retransmitter and the direction of the antenna. Accordingly, the distinction is made by utilizing the characteristics.

For example, reradiation may be performed after adding an identification signal of a continuous wave (CW: Continuous Wave) such as a sine wave of a specific frequency, and the GNSS receiver 510 may detect the identification signal and make the distinction. Many of GNSS receivers in recent years incorporate an FFT function for interfering wave detection. Thus, the identification signal can be detected by use of the function.

Wireless System

Figure 22A:
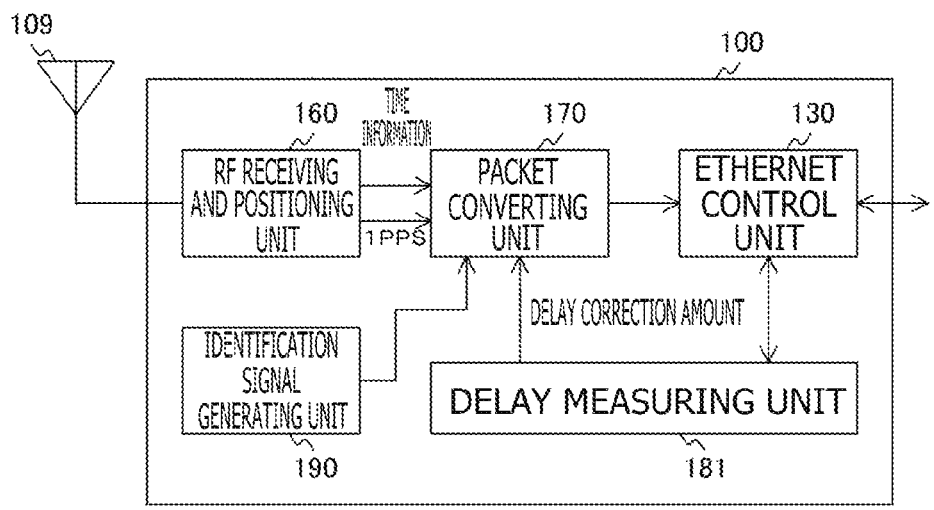
FIGS. 22A and 22B depict diagrams each illustrating an example of a configuration of a wireless system in a seventh embodiment of the present technology.
Figure 22B:
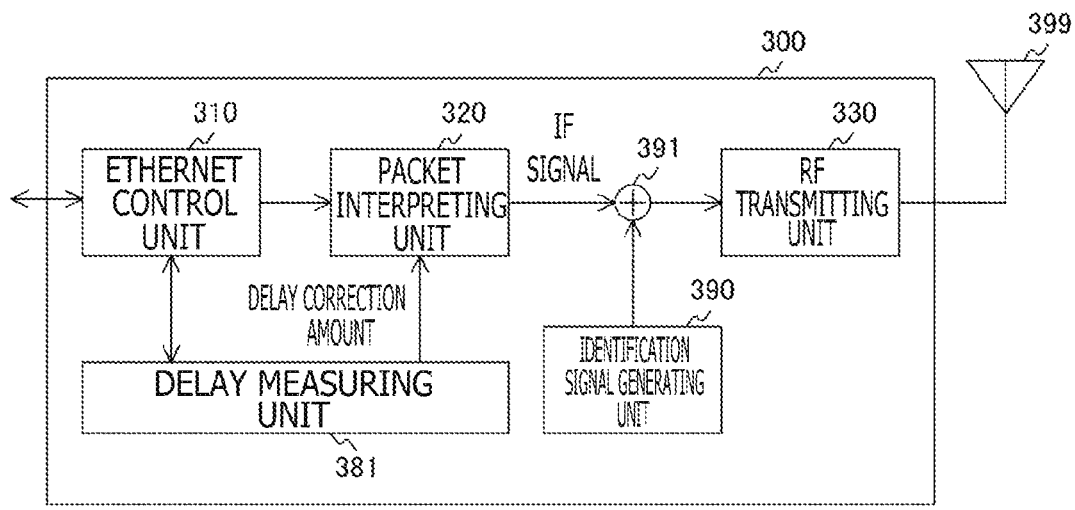

FIGS. 22A and 22B depict diagrams each illustrating an example of a configuration of a wireless system in the seventh embodiment of the present technology.

FIG. 22A illustrates a configuration example in a case where the high frequency signal receiving device 100 adds the identification signal. In this case, the high frequency signal receiving device 100 includes an identification signal generating unit 190. This identification signal generating unit 190 generates the identification signal, and outputs the identification signal to the packet converting unit 170. The packet converting unit 170 accordingly adds the identification signal to a packet.

FIG. 22B illustrates a configuration example in a case where the high frequency signal reradiating device 300 adds the identification signal. In this case, the high frequency signal reradiating device 300 includes an identification signal generating unit 390. This identification signal generating unit 390 generates the identification signal, and outputs the identification signal to a mixer 391. The mixer 391 outputs an intermediate frequency signal to which the identification signal is added to the RF transmitting unit 330.

FIG. 23 is a diagram illustrating an example of a spectrum of the intermediate frequency signal including the identification signal in the seventh embodiment of the present technology.

In the present example, it is assumed that the spectrum of the intermediate frequency signal is formed between frequencies f1 and f2, and it is assumed that identification signals of two waves are provided at the frequencies f1 and f2. It is to be noted that while identification signals of two waves are assumed in the present example, the number of identification signals is not limited. When the identification signals are increased, the scale of the generating circuit is increased, but erroneous detections can be reduced. In addition, when the frequencies of the identification signals are set outside the range, an effect on reception sensitivity can be suppressed.

Incidentally, as the identification signals, a spread signal based on a PRN (Pseudo-Random Noise) code not assigned to any satellite, for example, may be used in addition to the continuous wave.

Thus, according to the seventh embodiment of the present technology, it is possible to make an indoor/outdoor distinction in the GNSS receiver 510 by adding the identification signal generated in the identification signal generating unit 190 or the identification signal generating unit 390.

Incidentally, the foregoing embodiments represent an example for embodying the present technology, and matters in the embodiments have respective correspondence relations to inventive specific matters in claims. Similarly, the inventive specific matters in the claims have respective correspondence relations to matters in the embodiments of the present technology which matters are given names identical to those of the inventive specific matters in the claims. However, the present technology is not limited to the embodiments, but can be embodied by making various modifications to the embodiments without departing from the spirit of the present technology.

In addition, the processing procedures described in the foregoing embodiments may be regarded as a method having a series of these procedures, and may be regarded as a program for making a computer perform a series of these procedures or a recording medium storing the program. Usable as the recording medium is, for example, a CD (Compact Disc), an MD (MiniDisc), a DVD (Digital Versatile Disc), a memory card, a Blu-ray disc (Blu-ray (registered trademark) Disc), or the like.

It is to be noted that the effects described in the present specification are merely illustrative and are not limited, and that there may be other effects.

Incidentally, the present technology can also adopt the following configurations.

(1) A high frequency signal reradiating device including:
a packet receiving unit configured to receive a packet generated on the basis of a first high frequency signal;
a packet interpreting unit configured to perform synchronization processing for the packet and generate an intermediate frequency signal; and
a high frequency signal transmitting unit configured to convert the intermediate frequency signal into a second high frequency signal and transmit the second high frequency signal.

(2) The high frequency signal reradiating device according to the above (1),
in which the packet interpreting unit detects a missing part of the packet and interpolates dummy data in the missing part.

(3) The high frequency signal reradiating device according to the above (1) or (2),
in which the packet interpreting unit includes
a buffer memory configured to hold the packet, and
a rate adjusting unit configured to read the packet from the buffer memory on the basis of a remaining amount in the buffer memory and output the intermediate frequency signal according to a clock frequency shared with the high frequency signal transmitting unit.

(4) The high frequency signal reradiating device according to any one of the above (1) to (3), further including:
a delay measuring unit configured to measure a delay time between the high frequency signal reradiating device and another device that generates the packet,
in which the packet interpreting unit generates the intermediate frequency signal on the basis of the delay time.

(5) The high frequency signal reradiating device according to the above (4),
in which the delay measuring unit measures the delay time by transmitting and receiving a delay measurement packet to and from the other device.

(6) The high frequency signal reradiating device according to any one of the above (1) to (3), further including:
a beacon receiving unit configured to receive a time-synchronized beacon signal,
in which the packet interpreting unit generates the intermediate frequency signal on the basis of reception timing of the beacon signal.

(7) The high frequency signal reradiating device according to any one of the above (1) to (6),
in which the high frequency signal transmitting unit adds an identification signal for identifying a reradiated signal to the second high frequency signal and transmits the second high frequency signal.

(8) The high frequency signal reradiating device according to any one of the above (1) to (3) or (7),
in which the packet includes a GNSS (Global Navigation Satellite System) signal.

(9) The high frequency signal reradiating device according to any one of the above (1) to (7),
in which the packet includes an indoor positioning signal loaded with time information synchronized with a synchronizing pulse.

(10) A high frequency signal receiving device including:
a high frequency signal receiving unit configured to receive a high frequency signal and generate an intermediate frequency signal;
a packet generating unit configured to generate a packet on the basis of the high frequency signal; and
a packet output unit configured to output the generated packet to a communication path.

(11) The high frequency signal receiving device according to the above (10),
in which the packet generating unit receives a GNSS signal as the high frequency signal and generates the packet including the GNSS signal.

(12) The high frequency signal receiving device according to the above (10),
in which the packet generating unit receives a GNSS signal as the high frequency signal, obtains a synchronizing pulse from the GNSS signal, and generates the packet including an indoor positioning signal loaded with time information synchronized with the synchronizing pulse.

(13) The high frequency signal receiving device according to the above (12), further including:
a beacon transmitting unit configured to transmit a beacon in timing synchronized with the synchronizing pulse.

(14) The high frequency signal receiving device according to the above (10), further including:
a delay measuring unit configured to measure a delay time between the high frequency signal receiving device and another device that receives the packet,
in which the packet generating unit generates the packet on the basis of the delay time.

(15) The high frequency signal receiving device according to the above (14), in which
the delay measuring unit measures the delay time by transmitting and receiving a delay measurement packet to and from the other device.

(16) The high frequency signal receiving device according to any one of the above (10) to (15),
in which the packet generating unit generates the packet to which an identification signal for identifying a reradiated signal is added.

(17) A wireless system including:
a high frequency signal receiving device including a high frequency signal receiving unit configured to receive a first high frequency signal and generate a first intermediate frequency signal, a packet generating unit configured to generate a packet on the basis of the first high frequency signal, and a packet output unit configured to output the generated packet to a communication path;
a high frequency signal reradiating device including a packet receiving unit configured to receive the packet via the communication path, a packet interpreting unit configured to perform synchronization processing for the packet and generate a second intermediate frequency signal, and a high frequency signal transmitting unit configured to convert the second intermediate frequency signal into a second high frequency signal and transmit the second high frequency signal; and a wireless receiver configured to receive the second high frequency signal and perform positioning or time synchronization on the basis of the second high frequency signal.

REFERENCE SIGNS LIST

10: GNSS satellite
100: High frequency signal receiving device
109: Antenna
110: RF receiving unit
111: Low-noise amplifier (LNA)
112: Mixer
113: Low-pass filter (LPF)
114: Variable gain amplifier (VGA)
115: AD converter (ADC)
116: Phase-locked loop circuit (PLL)
117: Buffer
118: Frequency divider
119: Control unit
120: Packet converting unit
121: Serial/parallel converter
122: FIFO
123: Packet generating unit
124: Frequency divider
128: Clock generating unit
129: Control unit
130: Ethernet control unit
140: Temperature-compensated crystal oscillator (TCXO)
150: Host computer
160: RF receiving and positioning unit
161: GNSS positioning engine
170: Packet converting unit
171: Indoor positioning signal generating unit
181, 182: Delay measuring unit
190: Identification signal generating unit
191: Beacon control unit
192: Beacon transmitting unit
200: Communication path
300: High frequency signal reradiating device
310: Ethernet control unit
320: Packet interpreting unit
321: Packet analyzing unit
322: FIFO
323: FIFO remaining amount checking unit
324: Parallel/serial converter
325: Rate adjusting unit
326: Low-pass filter (LPF)
327: Frequency divider
328: Clock generating unit
329: Control unit
330: RF transmitting unit
331: DA converter (DAC)
332: Low-pass filter
333: Variable gain amplifier (VGA)
334: Mixer
335: Low-noise amplifier (LNA)
336: Phase-locked loop circuit (PLL)
337: Buffer
339: Control unit
340: Temperature-compensated crystal oscillator (TCXO)
350: Host computer
360: Packet interpreting unit
381, 382: Delay measuring unit
390: Identification signal generating unit
391: Mixer
393: Beacon receiving unit
399: Antenna
509: Antenna
510: GNSS receiver
520: System

The invention claimed is:

1. A high frequency signal reradiating device, comprising:
a packet receiving unit configured to receive a packet, wherein the packet is based on a first high frequency signal;
a packet interpreting unit configured to:
perform a synchronization process for the received packet; and
generate an intermediate frequency signal based on the performed synchronization process; and
a high frequency signal transmitting unit configured to:
convert the generated intermediate frequency signal into a second high frequency signal; and
transmit the second high frequency signal.

2. The high frequency signal reradiating device according to claim 1, wherein the packet interpreting unit is further configured to:
detect a missing part of the received packet; and
interpolate dummy data in the missing part.

3. The high frequency signal reradiating device according to claim 1, wherein the packet interpreting unit includes:
a buffer memory configured to hold the received packet, a parallel/serial converter configured to:
  read the received packet held in the buffer memory; and
  generate the intermediate frequency signal based on the read received packet, and
a rate adjusting unit configured to:
  control output rate of the generated intermediate frequency signal based on a remaining amount of the received packet in the buffer memory; and
  output the generated intermediate frequency signal based on a clock frequency associated with the rate adjusting unit, wherein
    the generated intermediate frequency signal is output based on the controlled output rate, and
    the clock frequency associated with the rate adjusting unit is same as a clock frequency associated with the high frequency signal transmitting unit.

4. The high frequency signal reradiating device according to claim 1, further comprising:
  a delay measuring unit configured to measure a delay time between the high frequency signal reradiating device and a first device that generates the packet, wherein the packet interpreting unit is further configured to generate the intermediate frequency signal based on the measured delay time.

5. The high frequency signal reradiating device according to claim 4, wherein the delay measuring unit is further configured to:
  transmit a first delay measurement packet to the first device;
  receive a second delay measurement packet from the first device, wherein the second delay measurement packet is received based on the transmitted first delay measurement packet; and
  measure the delay time based on the transmitted first delay measurement packet and the received second delay measurement packet.

6. The high frequency signal reradiating device according to claim 1, further comprising:
  a beacon receiving unit configured to receive a time-synchronized beacon signal, wherein the packet interpreting unit is further configured to generate the intermediate frequency signal based on reception time of the time-synchronized beacon signal.

7. The high frequency signal reradiating device according to claim 1, wherein the high frequency signal transmitting unit is further configured to:
  add an identification signal into the generated intermediate frequency signal to identify a reradiated signal, wherein the reradiated signal is the second high frequency signal; and
  transmit the second high frequency signal.

8. The high frequency signal reradiating device according to claim 1, wherein the packet includes a Global Navigation Satellite System (GNSS) signal.

9. The high frequency signal reradiating device according to claim 1, wherein
  the received packet includes an indoor positioning signal loaded with time information, and
  the time information is in synchronization with a synchronizing pulse.

10. A high frequency signal receiving device, comprising:
a high frequency signal receiving unit configured to:
  receive a Global Navigation Satellite System (GNSS) signal as a high frequency signal;
  obtain a synchronizing pulse from the received GNSS signal; and
  generate an intermediate frequency signal based on the received high frequency signal and the obtained synchronizing pulse;
a packet generating unit configured to generate a packet based on the generated intermediate frequency signal, wherein
  the generated packet includes indoor positioning signal loaded with time information, and
  the time information is in synchronization with the obtained synchronizing pulse; and
a packet output unit configured to output the generated packet to a communication path.

11. The high frequency signal receiving device according to claim 10, further comprising a beacon transmitting unit configured to transmit a beacon, wherein the beacon is in time synchronization with the synchronizing pulse.

12. The high frequency signal receiving device according to claim 10, further comprising:
  a delay measuring unit configured to measure a delay time between the high frequency signal receiving device and a first device that receives the packet, wherein
    the packet generating unit is configured to generate the packet based on the measured delay time.

13. The high frequency signal receiving device according to claim 12, wherein the delay measuring unit is further configured to:
  transmit a first delay measurement packet to the first device;
  receive a second delay measurement packet from the first device, wherein the second delay measurement packet is received based on the transmitted first delay measurement packet; and
  measure the delay time based on the transmitted first delay measurement packet and the received second delay measurement packet.

14. The high frequency signal receiving device according to claim 10, wherein the packet generating unit is further configured to add identification signal into the generated packet to identify a reradiated signal.

15. A wireless system, comprising:
  a high frequency signal receiving device including:
    a high frequency signal receiving unit configured to:
      receive a first high frequency signal; and
      generate a first intermediate frequency signal based on the received first high frequency signal;
    a packet generating unit configured to generate a packet based on the generated first intermediate frequency signal, and
    a packet output unit configured to output the generated packet to a communication path;
  a high frequency signal reradiating device including:
    a packet receiving unit configured to receive the generated packet via the communication path,
    a packet interpreting unit configured to:
      perform a synchronization process for the received packet; and
      generate a second intermediate frequency signal based on the performed synchronization process, and
    a high frequency signal transmitting unit configured to:
      convert the generated second intermediate frequency signal into a second high frequency signal; and
      transmit the second high frequency signal; and
  a wireless receiver configured to:
    receive the second high frequency signal; and perform one of a positioning process or a time synchronization process based on the received second high frequency signal.

\* \* \* \* \*